Oct. 11, 1960 A. B. SEGUR ET AL 2,955,717
HACKING MACHINE
Filed Oct. 11, 1956 14 Sheets-Sheet 2
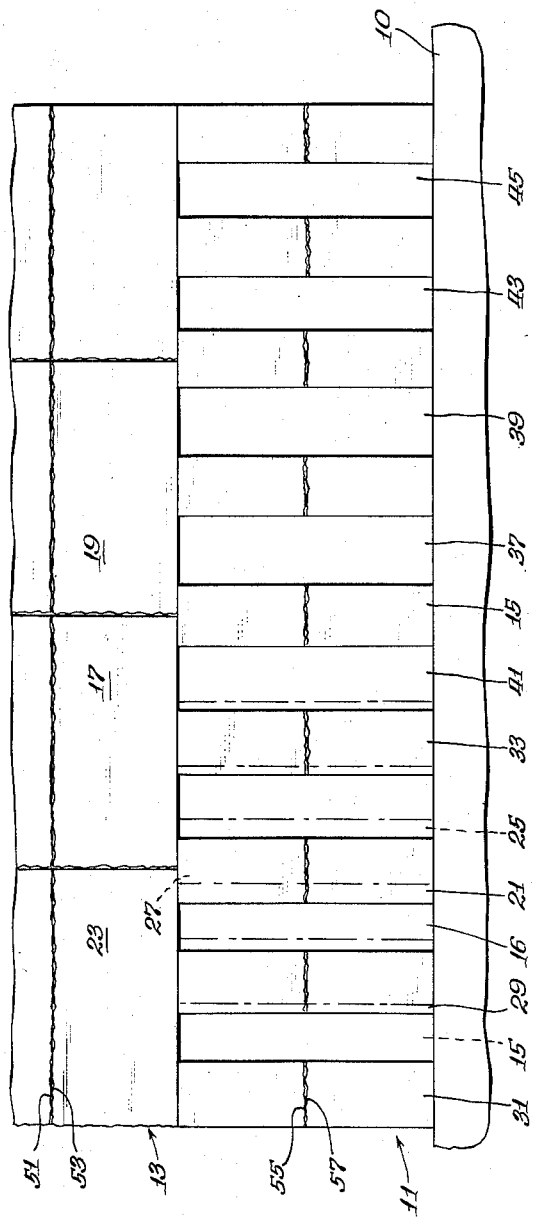
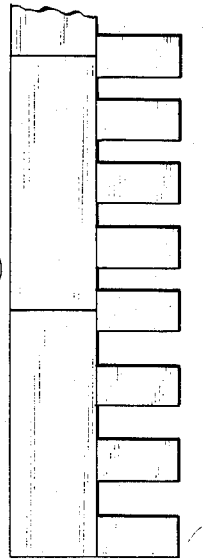
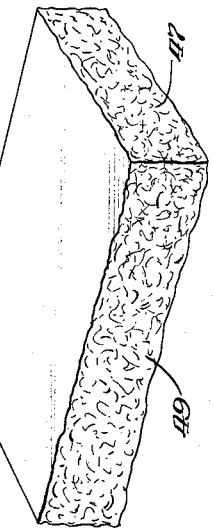
INVENTORS.
Asa B. Segur
Howard F. Esch
By: Nujen S. Stone
Atty.

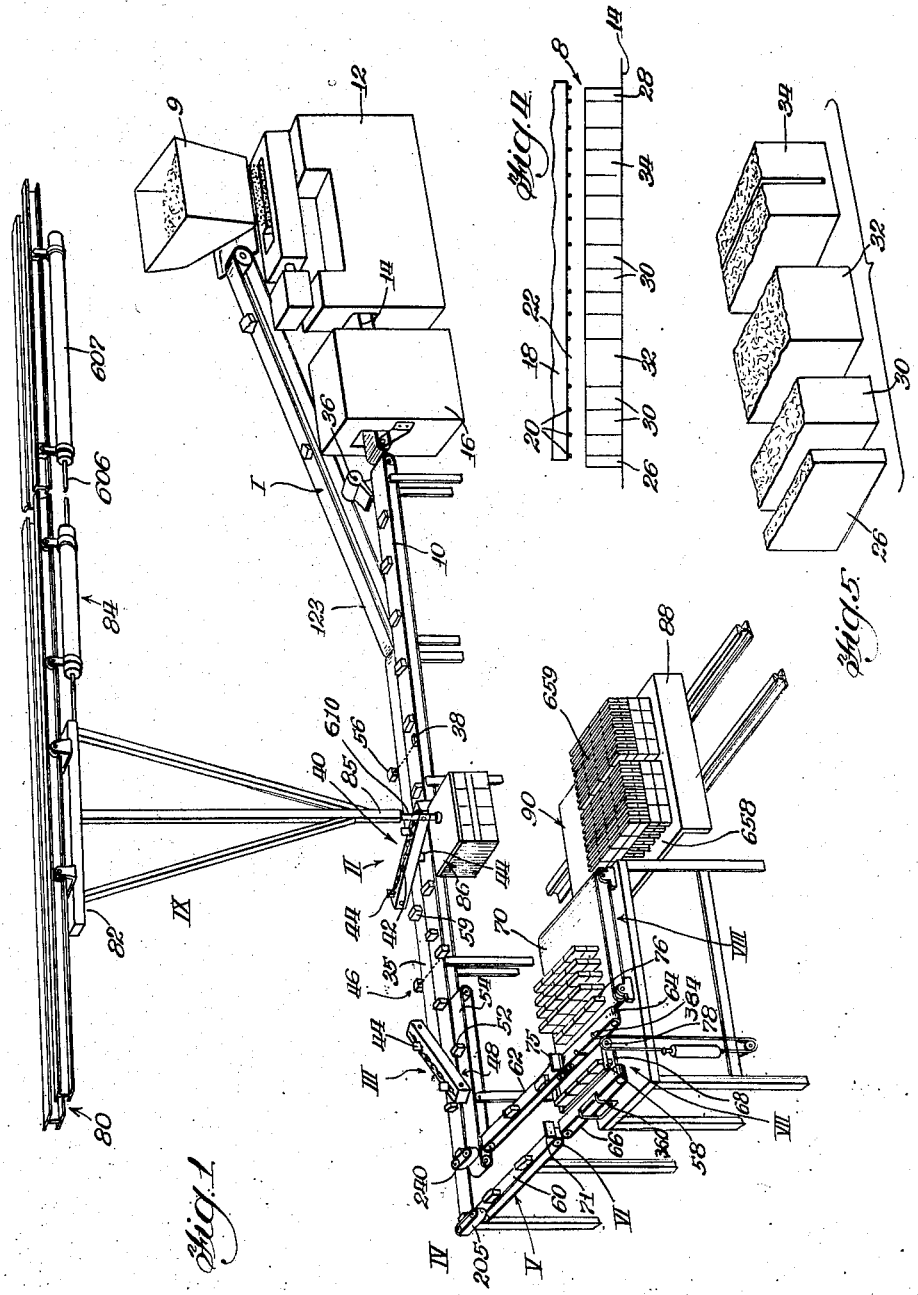

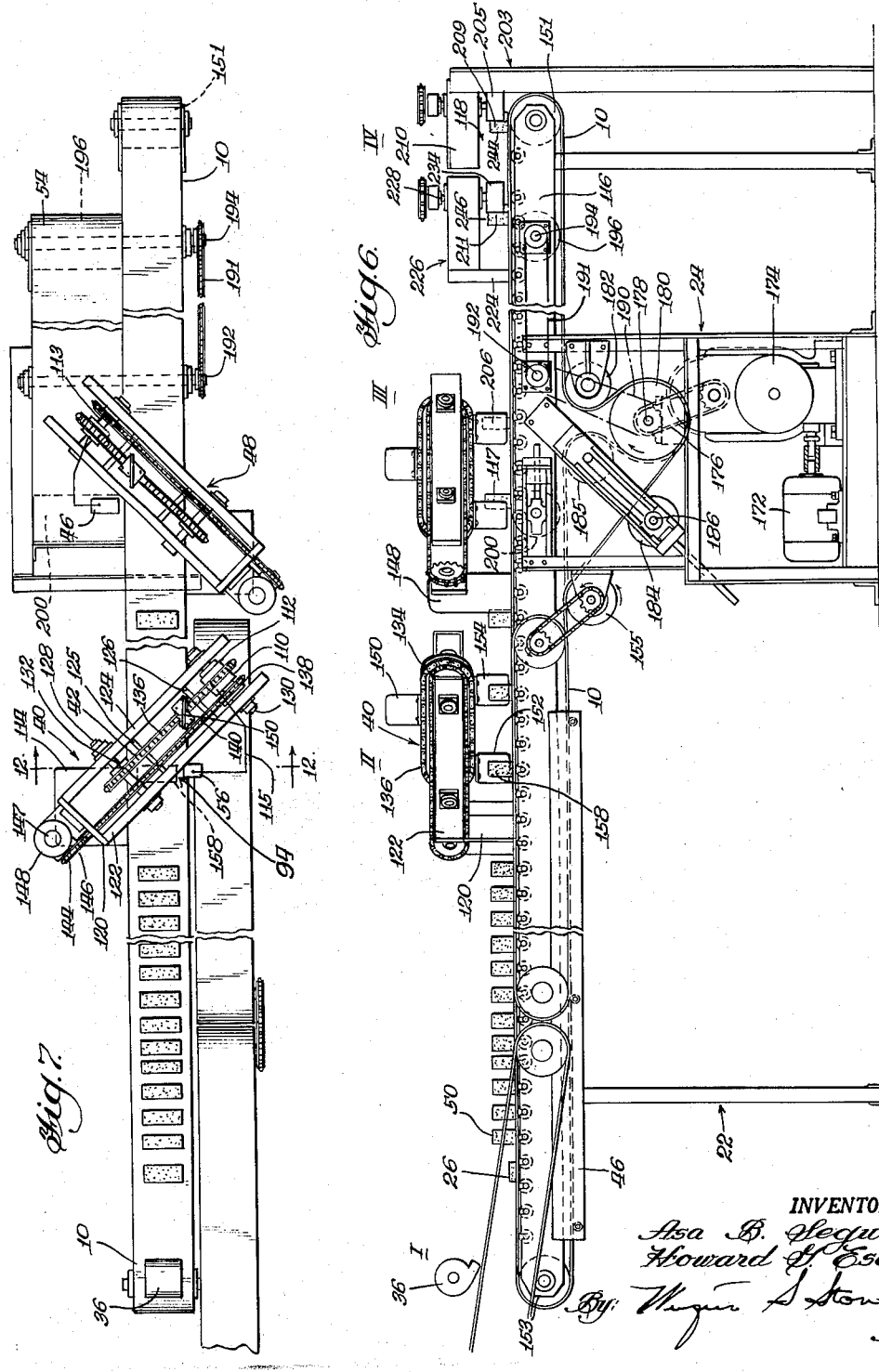

Oct. 11, 1960 A. B. SEGUR ET AL 2,955,717
HACKING MACHINE
Filed Oct. 11, 1956 14 Sheets-Sheet 4
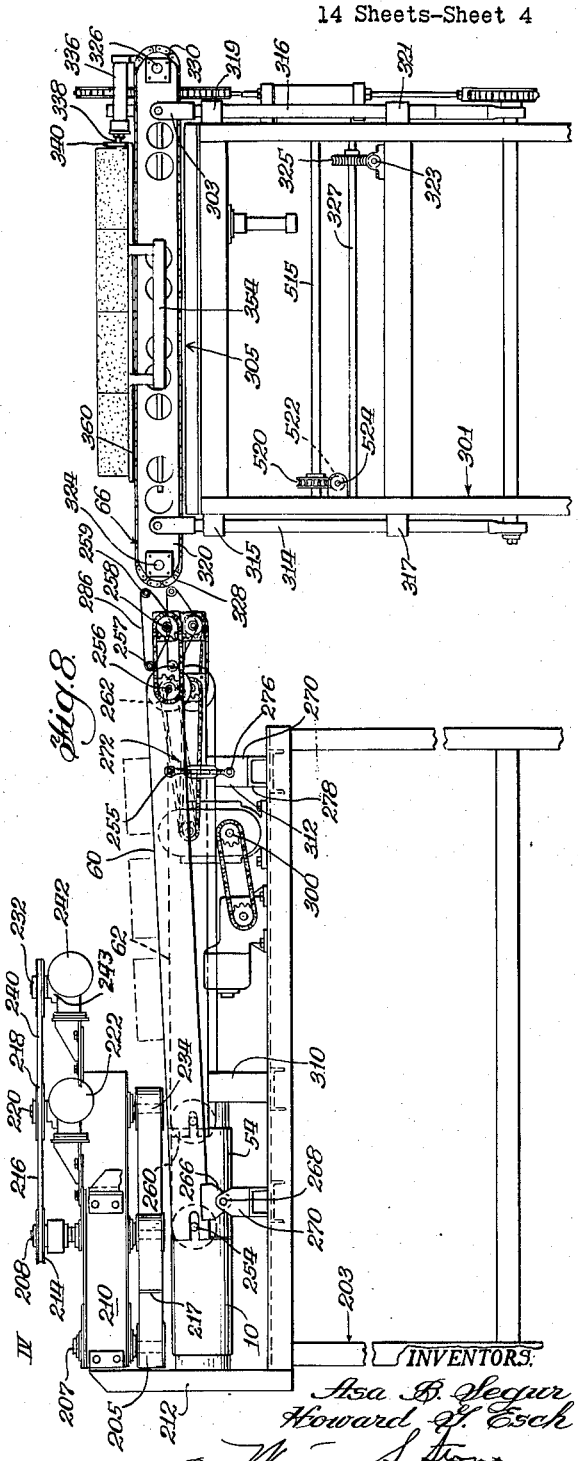
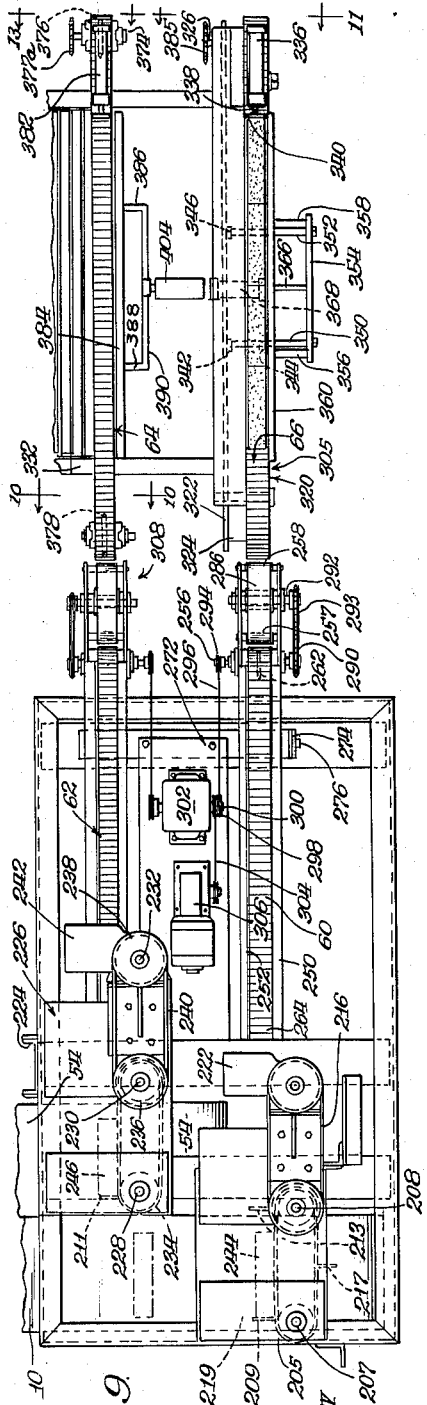
INVENTORS.
Asa B. Segur
Howard F. Esch
By Wigan S. Stone
Atty.

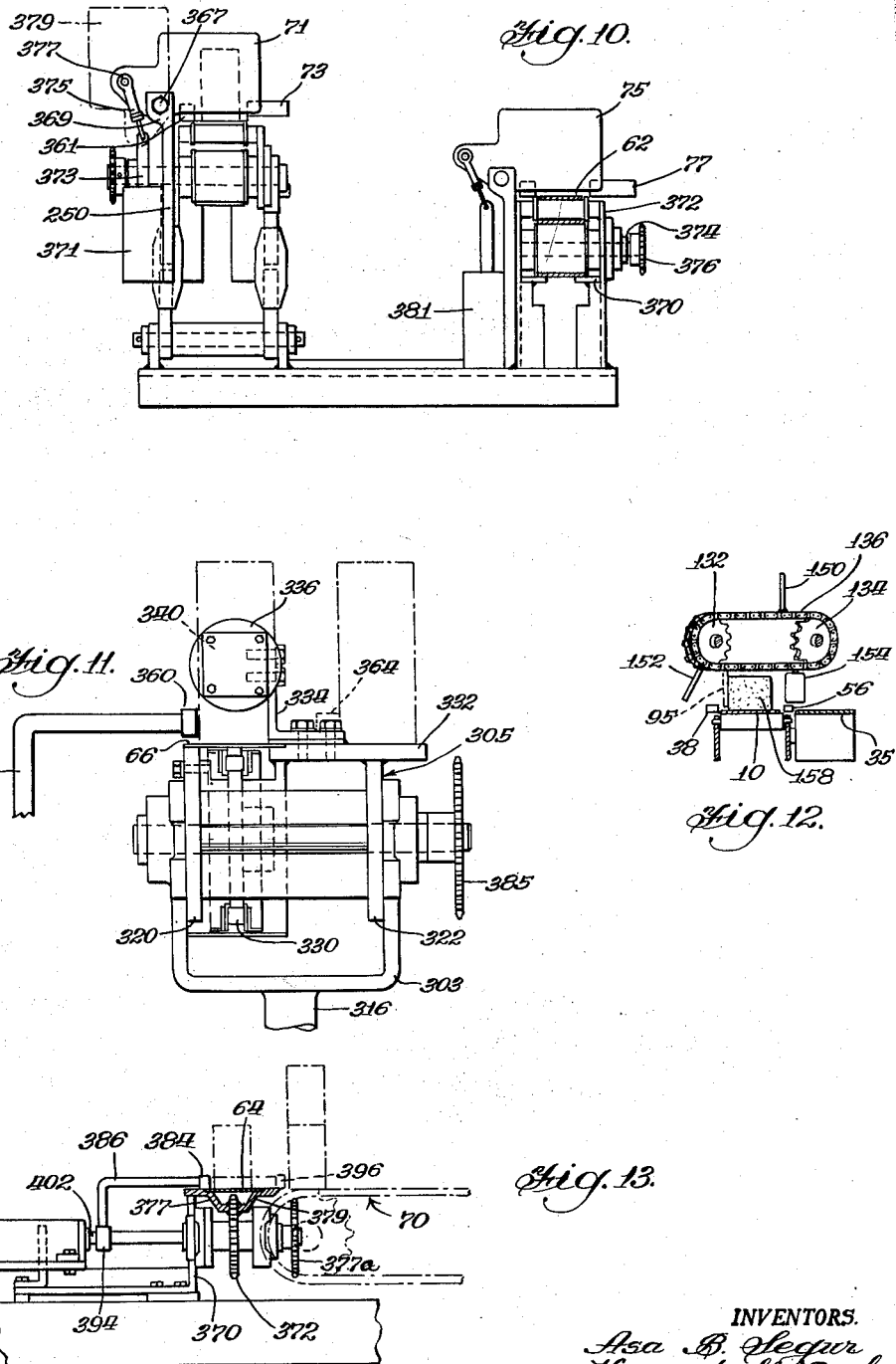

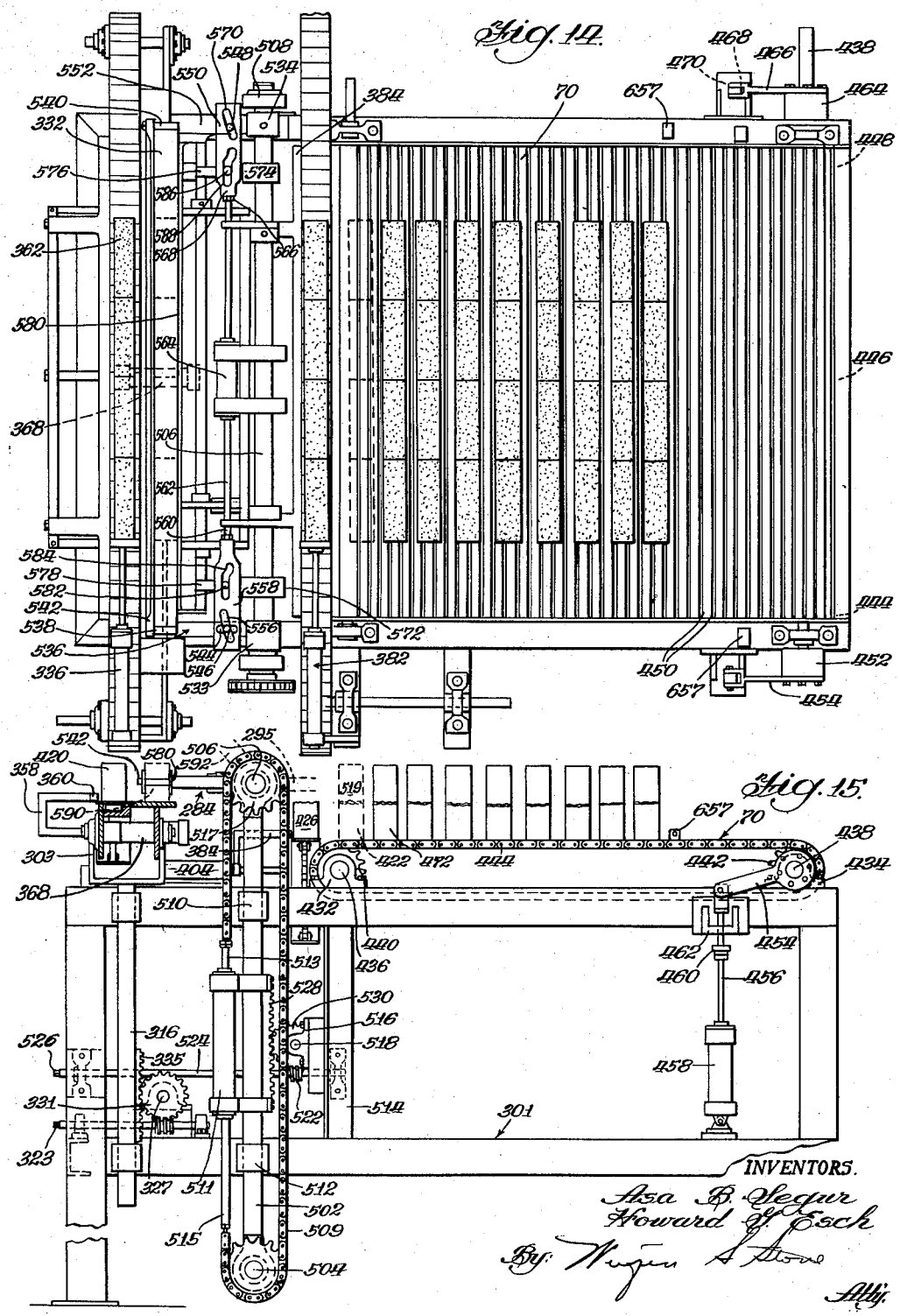

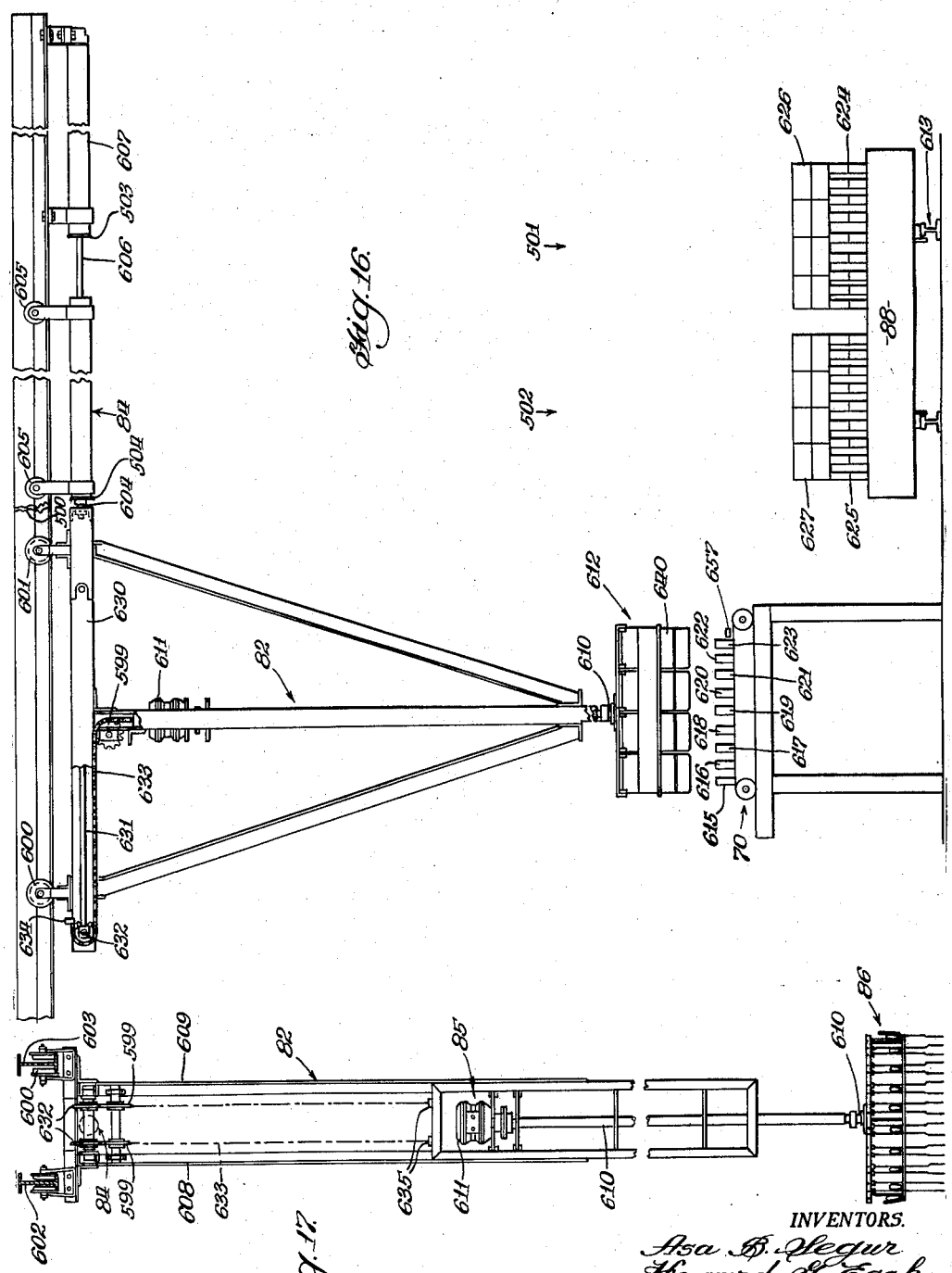

Oct. 11, 1960 A. B. SEGUR ET AL 2,955,717
HACKING MACHINE
Filed Oct. 11, 1956 14 Sheets-Sheet 8

INVENTORS.
Asa B. Segur
Howard H. Esch
By
Atty

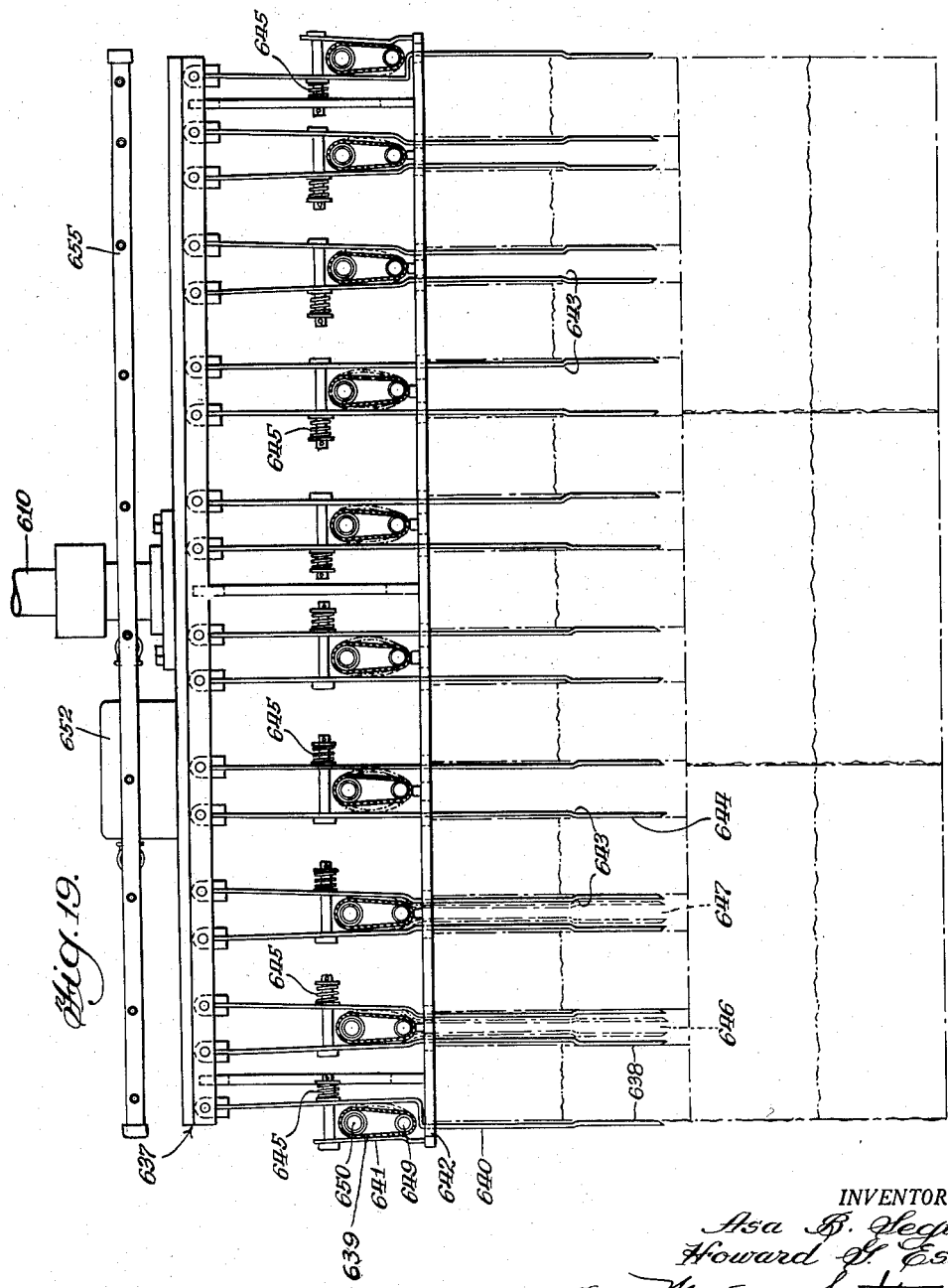

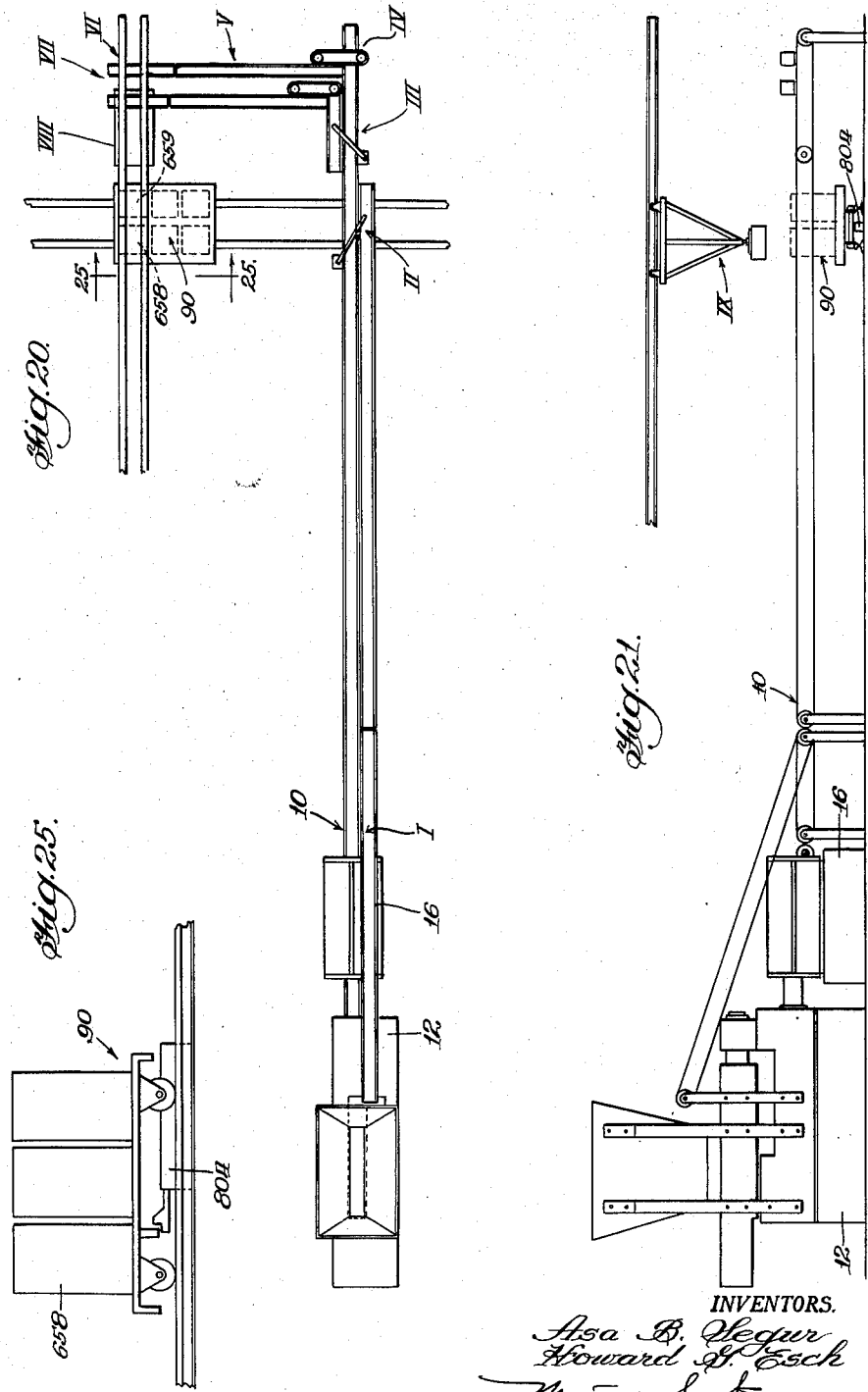

Oct. 11, 1960   A. B. SEGUR ET AL   2,955,717
HACKING MACHINE

Filed Oct. 11, 1956   14 Sheets-Sheet 11

INVENTORS.
Asa B. Segur
Howard F. Esch

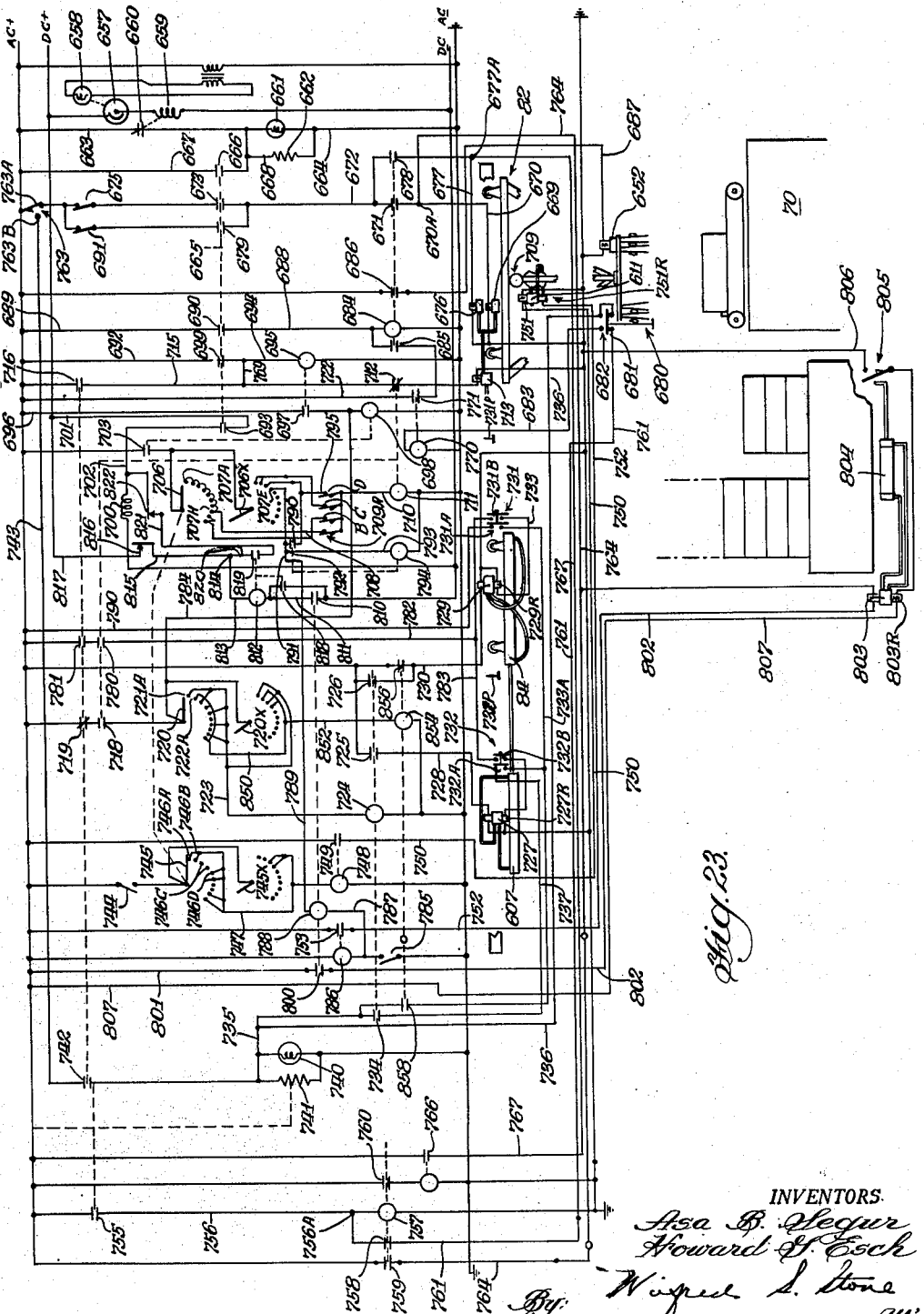

United States Patent Office 2,955,717
Patented Oct. 11, 1960

2,955,717

HACKING MACHINE

Asa B. Segur, Oak Park, Ill., and Howard G. Esch, Dearborn, Mich., assignors to Morris Clay Products Co., a corporation of Illinois Filed Oct. 11, 1956, Ser. No. 615,341

16 Claims. (Cl. 214—6)

This invention relates to a hacking machine, and more particularly, to a machine for automatically building a hack of green bricks on a bench preparatory to drying and firing. It should be read in connection with applicants' copending application on a Method of Hacking, Serial No. 615,401, filed October 11, 1956, now Patent No. 2,944,687.

A few preliminary words on terminology will be helpful. A hack is a stack of bricks. A hack for kiln burning is a stack of bricks spaced so that heat may directly contact a substantial surface area of the bricks. A bench is a platform having a flat surface, like a pallet, upon which a hack is made, and a bench car is a bench supported by rail wheels which can be moved through a tunnel kiln. A course is a straight row of bricks, and in this disclosure means four bricks endwise in a straight line resting on a side surface. A flat is nine parallel, straight courses of bricks positioned in a single plane, and a double flat is two flats, the brick of one flat resting upon and in registry with the brick of the lower flat.

A hack for kiln burning commonly consists of fourteen flats of brick, each flat consisting of nine parallel rows of four bricks laid on their long edges and endwise to each other, the rows in each flat being at right angles to the rows in an adjacent flat. Commonly, however, a hack consists of seven double flats, that is, there are two flats of nine parallel rows of four bricks each, with the bricks in each double flat in registry with each other, as illustrated in Figure 1. This is the hack that applicant is particularly interested in, but it will be appreciated that the number of bricks in a row and the number of rows in each layer can be increased or decreased. A hack, however, has a square plan configuration.

Importantly, the rows in a good hack are not evenly spaced for the reason illustrated in Figure 2. The lower double flat, identified by the numeral 11, is shown with the bricks endwise, while the superimposed double flat 13 is shown with the bricks sidewise. If the rows in the lower level are evenly spaced, the center row of bricks 15 will be exactly centered under the joint between the bricks 17 and 19, but the third from the left brick 21 will not be centered under the joint between the bricks 23 and 17, but will be in the dotted-line position 25. There is a tendency for the corner 27 to be deformed and even to spall. Consequently, under best practice, a hacker positions the brick 21 as shown in its solid-line position, that is, so that the center of the brick 21 will be centered under the joint between bricks 23 and 17. The brick 29 occupies the solid-line position shown which is midway between the bricks 31 and 21. The spaces between the three bricks 31, 29 and 21 in their solid-line positions are then slightly more than two-thirds the thickness of a brick.

Similarly, the brick 33 is exactly centered between the bricks 15 and 21 and each space between the bricks 21, 33 and 15 is exactly equal to the thickness of a brick. The same is true to the right where the spaces 37 and 39 exactly equal space 41. The spaces 43 and 45 are narrow spaces.

Hacking brick manually according to the above pattern is slow. The hacker must carefully space each row of brick with the eye. Applicant Segur's Patent No. 2,748,957 shows pattern members for assisting the hacker in correctly placing the brick. Hand hacking requires holding the green brick between the fingers. If the consistency is a little soft, finger marks are left in the brick. More seriously, a hacker can damage brick by squeezing which causes them to be rejected by the user.

The double flat hacking system is used almost exclusively by the manufacturers of face brick. The standard face brick has only two faced surfaces, namely, one end face 47, as shown in Figure 3, and one side face 49. The other end, opposite side, top and bottom are smooth. Special bricks are not infrequently made with both sides finished or both ends finished. In hacking, it is best to place the faces toward each other as illustrated in Figure 2. Referring to that figure, a smooth surface can sustain more load per square inch without deforming as at 27 than can a faced surface, which is a surface formed of protuberances and grooves. Consequently, the finished faces are directed toward each other, see for example, faces 51 and 53, and faces 55 and 57.

A successful machine for automatically hacking bricks on a movable kiln bench has long been needed. Several machines have been designed. One group of these attempts to stack the bricks in a rectangular, vertical pile with spaces between them by a method simulating manual stacking, that is, each brick is placed in the desired position in the stack by automatic fingers. A second group of machines arranges a single flat of bricks and then transfers the entire flat to the stack by means of a plurality of tongs which clasp each brick and hold it in its proper position in the flat. The former type has not been too successful because it is slow. The latter type is unable to adapt itself to bricks of various sizes and hence represents an excessive capital investment. However, both types have shown promise because they have eliminated manual stacking, a process which is expensive at all times, and can be costly during labor troubles. A hacker by squeezing the soft green brick can so damage it that it will be rejected by a builder.

The first object of this invention is to provide an automatic hacking machine for practicing the method of hacking bricks disclosed in the concurrently filed application Serial No. 615,401, filed October 11, 1956. One of the features of this machine is the provision of a loading platform to receive a plurality of bricks arranged end to end in a straight row, of a broad conveyor belt which acts as a pattern table having its lead edge adjacent to the loading platform, and of means for pushing the row onto the conveyor belt and moving the belt a short distance to provide space for the next row.

A second object of this invention is to provide means for laying out a double flat on the pattern table while automatically positioning the faces of the brick in the lower flat upwardly, and the faces in the upper flat downwardly. This is the ideal relationship of faced brick for a heating or burning operation.

Another object of this invention is to provide a simple mechanical means for moving the pattern table for one of two different distances on a given cycle, together with means to vary each of these spacings. As the disclosure will make clear, this apparatus is costly and it is important that it be able to hack more than one size of brick, and at least one type of tile. All of the hacks will have a square plan configuration, and their plan dimension will be determined by the total length of several units. As will be made clear hereinafter in comparing the hacking problem of Norman brick shown in Figure 26 with the hacking of standard brick shown in Figure 2, one must be able to alter the spacing between rows of bricks quickly and to alter the sequence of the spacing.

Still another object of this invention is to automatically eliminate all imperfect brick coming from the pugmill, the cutter and the facer without human attention. A pugmill extrudes brick at a non-constant rate. Thus, it may extrude clay of constant cross section in quantities sufficient to produce 160 bricks in a minute, and the next minute it may extrude enough to produce over 200 bricks. The cutter, from a perfect pugmill blank, may produce 14 perfect bricks, but if it has a broken wire, or if one wire engages a stone and fails to completely sever the two bricks, it may produce ten perfect bricks and four wholly unusable bricks, such as double bricks. One of the features of applicants' invention is the provision of a long conveyor upon which is initially deposited the entire output of the pugmill cutter and facer with means adjacent the conveyor for removing without human attention all scraps and imperfect bricks.

In connection with the above-mentioned object of turning the facings of the upper flat of bricks downwardly upon the faces of the lower flat, another object is to divide the total output of perfect bricks into two parallel paths with the bricks moving parallel with the conveyor. One of the features of this invention is the provision of means for moving every alternate perfect brick from the main conveyor to a parallel secondary conveyor, the brick being at right angles to the length of the conveyor, and then transferring the brick on each one of the conveyors to the other conveyors at right angles thereto so that the brick are now moving in two parallel lines with their length parallel to the line of movement.

Another object of this invention is to automatically move the double flat to a bench car and stack them at right angles to the one immediately below, all automatically. In connection with this object, applicants further seek to be able to automatically erect several hacks on a single bench car. The tendency is to build tunnel kilns to accommodate large cars, and a feature of applicants' invention is the co-ordination of movements of a bench car with a transfer hoist so that when one full hack has been erected, the car may be moved for the next hack.

Another object of this invention is to carry out the entire hacking process in response to individual brick movement and not by co-ordination of different parts of the hacker with each other. Co-ordinating the operating parts of a hacker directly with a pugmill's output requires too many complicated controls. A pugmill extrudes a slab of clay at irregular intervals. Its output varies from 150 to 220 bricks a minute. One of the features of this machine is the actuation of each operating part of the machine in accordance with the presence of the requisite number of bricks for the particular step. Functioning of each element of the machine, therefore, is contingent not upon what has happened to some other element, but on what its own particular needs are.

These and such other objects as may hereinafter appear are attained in the embodiment of the invention disclosed in the accompanying drawings, wherein:

Figure 1 is a perspective view of the entire machine showing in a general way each of the stations for performing the various functions;

Figure 2 is a side elevation of the lower three and a portion of the fourth flats of a hack resting on a bench;

Figure 3 is a perspective view of a face brick showing the side and end which alone are ordinarily faced;

Figure 4 is a schematic illustration of a cutter above a pugmill extrusion and illustrates with Figure 5 the various types of defective brick shapes which may be obtained from the cutter;

Figure 6 is a side elevation of the pugmill conveyor;

Figure 7 is a plan view of the pugmill conveyor;

Figure 8 is a side elevation of the twin conveyors feeding the hacking table shown in end elevation;

Figure 9 is a plan view of the conveyors, with underlying portions of the hacking table omitted, and the brick gates shown in Figure 10 omitted;

Figure 10 is a view taken on the line 10—10 of Figure 9, but turned 90°;

Figure 11 is a view taken on the line 11—11 of Figure 9;

Figure 12 is a view taken on the line 12—12 of Figure 7;

Figure 13 is a view taken on the line 13—13 of Figure 9;

Figure 14 is a plan view of the hacking table;

Figure 15 is a front elevation of the hacking table;

Figure 16 is a side elevation of the transfer hoist;

Figure 17 is an end elevation of the transfer hoist;

Figure 19 is an end elevation thereof;

Figure 20 is a plan view of the entire assembly drawn to scale;

Figure 21 is a side elevation thereof;

Figure 23 is a wiring diagram of the controls for the transfer hoist only superimposed schematically on the operated parts;

Figure 25 is a view taken on the line 25—25 of Figure 20; and,

Figure 26 is a view illustrating the hacking of Norman brick.

Figure 24:
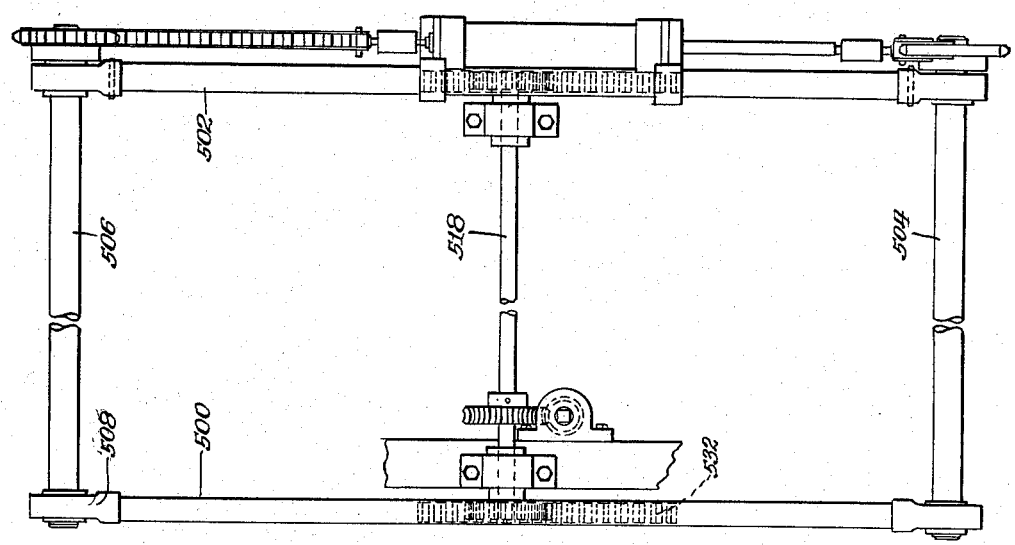
Figure 24 is a front view of the frame of the turnover stacker.

Applicants will generally describe the machine including the functioning of various parts so as to set forth its features. Thereafter, the equipment will be described in greater detail to establish operability.

Referring to Figure 1, see also Figures 20 and 21, applicants' complete automatic hacker comprises conveyors laid out in the plan of an L along which are positioned a series of operating stations.

The pugmill conveyor 10 has positioned along its length:

I. Blower for tipping over thin bricks and removing shavings;
II. The imperfect brick rejector; and
III. The twin row distributor.

The twin row, two level conveyor includes:

IV. The twin row redirector;
V. The elevator conveyor; and
VI. The transverse alignment platform and stop gates.

The twin level hacker includes:

VII. The turnover arm; and
VIII. The pattern table.
IX. Finally, there is a transfer hoist which automatically transfers the bricks on the pattern table, while retaining the pattern, to a bench where the crane builds the hack.
X. The bench car station.

Referring to Figure 1, the numeral 10 identifies the pugmill conveyor which is the initial section of the complete brickmaking apparatus. The brick machine 12 extrudes columns of pressed green clay onto a conveyor 14 which transfers the column into a cutter 16 which may include a facer. If the brick is to be a face brick, the top and one side of the clay column will be embossed by wires, etc., to obtain the design effect desired. This is done on the top of the slab and the far side as viewed in Figures 3 and 5. Neither the brick machine 12 nor the cutter or facer 16 forms parts of this invention.

The column or slab of clay, which is called the pugmill, is usually continuous, but may have a length slightly less than the total thickness of sixteen brick and the cutter operates on the column of clay as schematically illustrated in Figure 4. This double ended slab alone will be described as a matter of convenience. Here, the operating elements of the cutter are shown as a frame 18 and a plurality of equally spaced cutter wires 20. The cutter wire at 22 is missing, having been broken. The slab of green clay is moved under the frame 18 so that its lead end is perhaps an inch beyond the lead wire 20. The lead end of the slab is imperfect and may not be quite square. When the cutter descends, it may produce four different shapes, but all with identical cross sections. There are the two thin bricks 26 and 28, see also Figure 5, perfect bricks such as 30, a double brick 32, and a partially cut twin brick 34. This last occurs where the wire encounters a stone or the like in the clay column which prevents the wire from completing the cut. All shapes must be eliminated excepting the perfect bricks 30. This brick is faced on the top and the far end. All other surfaces are smooth.

The belt 10 moves sufficiently more rapidly than the conveyor 14 so that the bricks are spaced equidistantly one from the next as illustrated. In fact, they are about six inches apart. Blowing in the direction of movement is an air nozzle 36. This tips a thin brick such as 26 over onto its large surface and it also cleans the bricks and the belt of shavings. This constitutes station I.

The various shapes shown in Figure 5, equally spaced, are moved by the belt 10 into the imperfect brick rejector station II. This station consists of an electronic eye and switch, consisting of a photocell 56 and light source 38, and positioned in transverse, parallel alignment with respect to the belt 10 with the light path close to the belt's upper surface. The position of this light and photocell 56 and 38, and the same is true of those controlling station III, are shown in this figure in advance of the mechanism. As will appear later, they are actually located immediately below the imperfect brick rejector conveyor 40. Whenever a brick which is thicker than a perfect brick passes the electronic eye—this includes narrow brick which have been tipped over by the blower 36—a pusher assembly 40 is actuated. This assembly includes a chain 42 and pusher blades 44, and at the proper time any imperfect brick will be pushed onto the return conveyor 35 which conveys a rejected brick such as 59 to an inclined conveyor 123 which returns rejected clay to the pugmill 12 at a point adjacent the hopper 9.

The perfect bricks continue to the twin row distributor station III, this time passing between an electronic eye assembly 46 which controls a pusher assembly 48 identical to 40 but operating in the opposite direction. This electronic eye is connected to a timer which functions the pusher assembly 48 on each alternate interruption of the light path. Thus, the brick 50 continues along the belt 10. The brick 52 is pushed over onto a belt 54 which is adjacent the belt 10 and traveling at the same speed. By this arrangement, the single row of bricks is divided into two parallel rows as they move to the end of the pugmill conveyor 10.

Upon leaving the pugmill conveyor's two belts 10 and 54, the bricks enter the twin row, two-level conveyor. This conveyor has two purposes: firstly, to move the bricks lengthwise in equal numbers along parallel paths; and secondly, to assemble in transverse alignment two rows of four bricks each, with the bottom of one row at the level of the top of the other row.

Disposed at right angles to belts 10 and 54 are parallel chain conveyors 60 and 62. In order to move bricks from belt 10 onto conveyor 60, there is disposed above the end of belt 10 a belt 205, the plane of whose flight is vertical and at right angles to the plane of the top of belt 10 and whose direction of movement is also at right angles to belt 10. A plan view of these belts may be seen in Figure 9. When a brick nears the end of belt 10, its leading side engages the surface of belt 205 which moves the brick onto conveyor 60. The same relationship exists between belts 54 and the conveyor 62 through the action of the belt 240. The result is that the bricks are now moving endwise in two parallel rows toward a hacking table, as is clear in Figure 1.

However, the conveyor 60 is inclined upwardly while the conveyor 62 is horizontal. The conveyor 60 delivers brick to a horizontal chain conveyor 66 at the hacking station, the level of the top flight of which is in the plane of the top of the bricks on the chain conveyor 64 which receives bricks from the conveyor 62. Adjacent conveyor 66 is a waiting platform 68 for the upper course of brick, and adjacent conveyor 64 is a pattern table 70, which serves momentarily as an assembling platform for the lower course of brick. As the bricks reach the end conveyors 64 and 66, they encounter a stop, not shown in this figure.

Disposed at the point where the belt 60 delivers onto the chain conveyor 66 is a gate 71 controlled by an electronic eye 73 (see also Figure 10). Similarly disposed at the point where the belt 62 delivers to the chain conveyor 64 is a gate 75 and an electronic eye 77 (see Figure 10). When four bricks have passed electronic eye 73, the gate 71 closes, thereby holding back other brick. The four bricks accumulate on the conveyor 66 by butting up against a stop. Immediately, the pusher 360 moves the four bricks on the conveyor 66 onto the holding table 68 and concurrently the pusher 384 pushes the four bricks on the conveyor 64 over onto the pattern table 70. When the pushers 360 and 384 have returned from points above the conveyors 66 and 64, the gates 71 and 75 rise and the next four bricks are permitted to pass by the electronic eyes 73 and 77.

The presence of four bricks on the holding platform 68 and the leading edge of the table 70 is the basis of applicants' hack. The number of bricks in a row could be increased and the shape of the bricks can be altered, but the basic concept is placing a plurality of bricks endwise and building up a stack from parallel rows of bricks initially separately assembled.

Continuing to refer to Figure 1, the numeral 58 identifies a pair of arms carrying clamps which grasp the row of four bricks with their face surfaces up and pivoting 180° on the shaft 78 lay them with their faces down on the upper faces of the four bricks at position 76. This is the turnover stacker station VII. As each double row of eight bricks are stacked, the pattern table, station VIII, which is an endless belt, moves to the right. When nine superimposed rows of eight bricks each, i.e., two flats, are on the pattern table, the pattern is complete. Applicants' pattern consists of arrangements of four bricks spaced in accordance with what is required for stacking the two rows on a lower set of rows and for supporting another pattern at right angles thereabove. It is evident that bricks of varying lengths can be used and bricks of varying heights or widths. It is further evident that by the length of movement of the pattern table 70 after each set of bricks are placed upon it, one can accommodate firstly for different thicknesses of brick, and secondly, for different spacing of brick.

Station IX is the hoist transfer and consists of a twin rail 80 from which is suspended a carriage 82 movable along the rail by a pair of air cylinders 84 and 607 connected in series. Movably mounted vertically on the carriage 82 is a shaft 610 on the bottom of which is a battery of clamping jaws or tongs 86 adapted to pick up the entire pattern of nine parallel double flats of rows of eight bricks as they rest on the pattern table 70. This is done automatically. When the pattern table 70 acquires the full twin flat of bricks, the air cylinder has already positioned the battery of tongs over the table 70. The parallel rows of the tongs 86, as shown in Figure 1, are at right angles to the row of bricks on the pattern table 70. The tongs, when above the table, are turned parallel thereto by equipment not here shown but described subsequently. The tong assembly seats over the brick, clamps them, and carries them over the railroad bench car 88, station X. The position of the bench car 88 is controlled by means not shown in Figure 1. The bricks are set in position automatically, each load being turned 90° with respect to the load below. Seven double flats complete a hack. Two hacks are built simultaneously. When two hacks have been completed, a third hack is commenced at position 90, the car 88 having been moved forward.

*Detailed description of applicants' hacker*

The hacking machine stations will now be described in sufficient detail so that the mechanics of its operation is clear. Full mechanical details are not set forth in either the disclosure or the drawings, but the details omitted are old and self-evident in the mechanical arts.

Referring to Figure 6, the pugmill belt conveyor 10 is supported on two-legged pedestals such as 22 and a table 24. The supporting frame consists of side plate assemblages such as 46 which carry belt rolls 151 and 153 over which is entrained the belt 10.

Continuing to refer to Figures 6 and 7, the first station is the shaving-removal and narrow-brick upsetter station I. As the bricks leave the cutter station, there are frequently stringers or curls of clay adhering thereto. These are particularly common where wires have been used to face bricks. These shavings are troublesome only where they accumulate. They drop off the belt, or at the corner station they may adhere to other bricks, etc. An air blower 36, see Figure 1, removes these shavings. There may be a plurality of blowers pointed in different directions as the need arises. Importantly, one air nozzle, directed longitudinally of the conveyor, is used to tip over narrow bricks such as 26.

The brick-reject station II comprises an electrically driven, mechanical pusher for removing unwanted bricks from the belt 10, and an electric circuit actuated by a photoelectric cell and operated through timers and switches to function the mechanical pusher. The mechanical pusher assembly 40 will be described first.

Referring to Figures 6 and 7, mounted on a plate 114 which is mounted at one side of the conveyor belt 10, is an upright plate 120 mounted at approximately a 45° angle to the length of the belt 10. Extending at right angles from the plate 120 are two arms 122 and 124 which are held in spaced relationship by webs 125 and 126 and which support two shafts 128 and 130 and sprockets 132 and 134 over which is entrained a chain 136. Keyed to the shaft 130 is a sprocket 138 over which is entrained a chain 140 which passes through an opening in the plate 120 and is entrained over a sprocket 144. This sprocket 144 is mounted on a shaft 146 which is driven through a reduction gear assembly 147 by a motor 148.

Returning to the shaft 130, the solenoid and clutch assembly 110 and 112 upon actuation through the circuit schematically shown by the line 115, by the photocell 56 rotate the sprocket 134 once. The double pitch roller chain is exactly three times the length of the drive diameter of the sprocket 134, and hence on each actuation, the chain moves one-third its length. Mounted on each of three equally spaced chain links are pusher blades such as 150, 152 and 154. The pusher blade is at an angle of 45° with the chain and consequently it is parallel with the length of the belt 10, see Figure 7. In Figure 6, the pusher blade 152 is shown in ready position, the chain being still. The blade 154 is shown at the end of the stroke just after it has pushed the double brick 156 off of the belt 10 onto the return belt conveyor 35.

When a double brick or thin brick lying on its side reaches the dotted-line position 158, the photocell 63 actuates the solenoid 110 which closes the single revolution clutch causing the pusher blade 152 to move along a diagonal path beneath the chain 136 to the position occupied by the pusher blade 154. The chain moves at a speed such that the blade in traversing this distance does so in the same time required for the belt to move from the position 152 to the position 154 as viewed in Figure 6, and consequently, the brick is not moved lengthwise of the belt but laterally only. There is no sliding between the surface of a blade and a brick engaged by it. The only sliding is transversely of the belt.

Figure 22A:
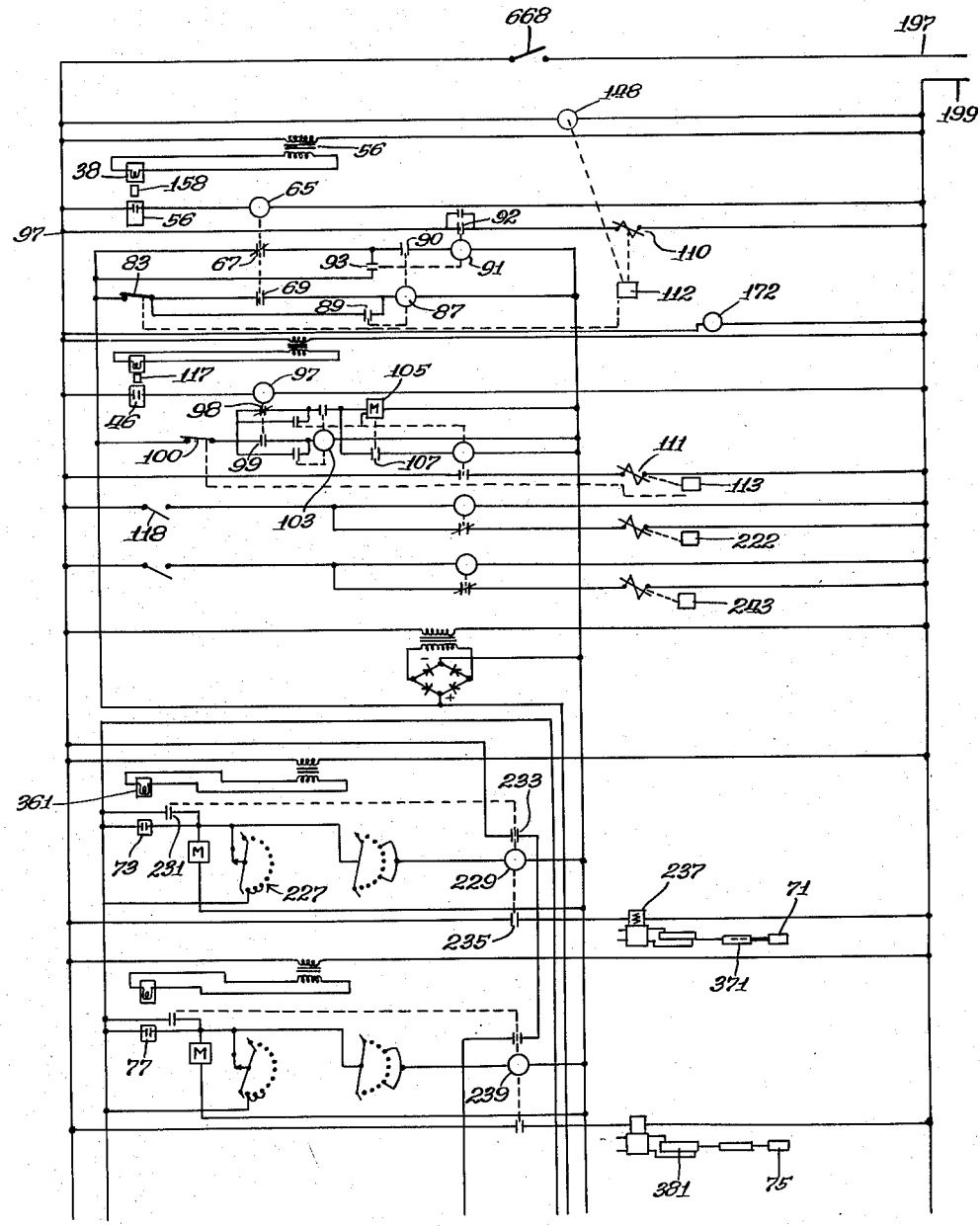
Figures 22A, 22B and 22C are wiring diagrams showing the operation of the equipment.

Describing now the electric circuits used to function the brick-reject station, and referring to Figure 22A, the numerals 197 and 199 identify the positive and ground of a power line. The light bulb 38, see also Figure 12, is connected through a transformer 56 to the source of power. The brick 158 is positioned between the light 38 and the kickoff photoswitch 56. When the brick 158 breaks the light path, the kickoff solenoid photoswitch 56 completes the circuit to a kickoff photoswitch delay relay 65, thereby opening normally closed contacts 67 and closing normally open contacts 69. This closes a circuit through a kickoff solenoid limit switch 83 through a kickoff reset relay 87, thereby closing its own holding contact 89 which is in shunt with the contacts 69. Also closed is another contact 90 which is in series with contact 67 and connected to a kickoff solenoid relay coil 91.

The light beam will be interrupted by the passage of bricks which are standing on edge, spaced approximately six inches apart. With the belt traveling at a minimum speed of 125 feet per minute and handling an average of 180 bricks per minute—the light beam will be interrupted for a period of about .08 second duration. The kickoff photoswitch delay relay 65 will begin timing out the moment the kickoff solenoid photoswitch 63 is closed. This time delay setting is slightly longer than the time the light is normally interrupted by a perfect brick. The relay is adjustable in a range from .0 to .5 second.

If for some reason, the brick should be lying flat on the conveyor belt, or if a thin brick is lying flat on the conveyor belt due to the action of the blower 36, or if two bricks are held together, or if a brick is much thicker than normal due to a broken wire in the cutter, as double brick 158 actually shown in Figure 6, a light interruption of at least .16 second will occur. This will allow kickoff photoswitch delay relay 65 to return to its de-energized condition, thereby closing contact 67. A hot line is now completed to the kickoff solenoid relay coil 91 and the contacts of this relay 92 close a circuit from the hot line at 97 to the kickoff solenoid 110, see also Figure 7, which in turn actuates the single-revolution clutch 112, so that the defective brick will be swept off the conveyor. A second contact 93 in the kickoff solenoid relay coil 91 is in shunt with contact 67 so that it is not necessary for contact 67 to remain closed. The motor 148 operates continuously as the wiring diagram, Figure 22A, indicates.

Upon actuation of the single-revolution clutch 112, the kickoff solenoid limit switch 83 will be caused to open and thus allow the kickoff reset relay 87 to drop out, which in turn will open the circuit to the kickoff solenoid relay 91 thereby making the control of this clutch a single-revolution control electrically.

Figure 12 is a view taken on the line 12—12 of Figure 7, and is for the purpose of showing the relationship of the blade on the chain to the light source and to the brick on the belt conveyor. With the belt conveyor moving at approximately two feet a second, with the perfect brick two inches thick, and with the time delay at .08, the perfect brick will move through the point 94 and continue leaving the blade 152 immobilized. On the other hand, if there is a double brick, or more, the solenoid 110 is actuated which starts the chain which snaps the blade 152 into the dotted-line position 95, and the blade pushes the brick off the belt. The light source and the photocell are positioned just above the belt so that the blades will not interfere with the passage of light and a very thin brick lying on its side will be detected.

The twin-row distributor station III is also shown in Figures 6 and 7. At this station is provided the mechanism for driving the pugmill belt 10. In the base of the table 24 is disposed a motor 172 with driving reduction gearing 174. Through a belt 176 is driven a shaft 178 which carries a belt drum 180. Entrained over the belt drums 180 and 182 is the belt 10 which extends to the end of the frame 116 and thence over the pulleys 151, and then back to the lead end over pulley 153, and then to pulley 155. Pulley 184 on the shaft 186 may be moved as far as the dotted-line position 185 for purposes of tightening the belt.

Also driven from a shaft 178 through a chain drive 190 is a shaft 192 which also through a chain 191 drives a shaft 194. Referring to Figure 7, mounted on the shaft 194 and keyed thereto is a roll 196 over which is entrained the belt 54 whose other end is entrained over a roll 200. It is evident that the belt 54 and the belt 10 operate at exactly the same speeds.

Mounted on the near side of the pugmill belt conveyor frame is a pusher blade assembly 48 which is identical with the one heretofore described. It extends over both belt and it is actuated by a photocell 46. The photocell actuates a single-revolution clutch on each alternate actuation of the photocell switch 46. This will deliver every other brick on the main conveyor 10 over onto the secondary conveyor 54.

The electrical operation of the brick transfer assembly is as follows. Referring to Figure 22A, when a brick interrupts the light to the stagger solenoid photoswitch 46, the stagger photoswitch delay relay 97 opens normally closed contacts 98 and closes normally open contacts 99. This closes a circuit through the stagger solenoid limit switch 100 and the contacts of a stagger solenoid reset relay 103 to a stagger solenoid ratchet switch 105. The ratchet switch contacts 107 are closed at every other impulse because the contacts of the stagger photoswitch delay relay alternately open and close. Whenever the contacts 107 are closed, the circuit is completed to the stagger solenoid relay 111 which energizes the stagger solenoid single-revolution clutch 113, see also Figure 7. At the end of each actuation of the stagger solenoid relay, the stagger solenoid limit switch 100 is reset.

It is of the utmost importance that one understand that both the rejected brick assembly II and the brick transfer assembly III operate in response to a brick which actually functions a photocell. As one looks at the drawings, one sees the bricks exactly spaced, but the machine shown here is successful because the entire design is predicated upon the fact that the bricks need not be exactly spaced. The pugmill's production of brick slabs may vary as much as a total of 60 bricks a minute. When the cutter is working properly, it may produce 15 perfect bricks on each actuation, and when it is working improperly, due to a broken wire or an improperly set wire, there may be one to two double bricks or partially cut bricks in each slab cut. Moreover, the movement of the bricks from the slow moving conveyor to the fast moving conveyor may not be very perfect. In short, the spacing of the bricks may vary from two inches to four inches even when a succession of perfect bricks is delivered from the cutter. The basic idea of the reject station is that it eliminates imperfect bricks. The imperfection always occurs in the thickness because the pugmill turns out a blank which has a substantially perfect plan configuration, i.e., in the case of the ordinary brick, 3¾″ x 7¾″.

Returning to Figure 7, when a brick actuates the photocell 46, it will move to the position of the blade 206 and be moved over to belt 54. The next brick, irrespective of its spacing behind the first brick, will actuate the photocell but mechanically it will be disabled and this brick will continue along the table 10. The result is that there is delivered to the end of the belt 54 exactly the same number of perfect brick that is delivered to the end of the pugmill conveyor belt 10, but the time of arrival is not evenly spaced. Thus, a brick might reach the end of the belt 10 and there be carried on through the twin-row redirector station shortly to be described, and another brick might not reach the end of the table for several seconds. This makes no difference in the ultimate functioning of the hacker, for the success of the device is based upon the arrival of a requisite number of bricks at the hacker and not upon any coordination between parts of the hacker and any of the stations along the pugmill belt conveyor.

*The twin-row, two-level conveyor*

The transfer of the bricks moving along two parallel paths at right angles to their length to the twin-row, two-level feeder belts is effected at a table 203, the end of which may be seen in Figure 6 and the side and plan views may be seen in Figures 8 and 9. This first station is the twin-row redirector IV supported on a table 203, see Figures 6, 8 and 9. The sole purpose of this station is to move the bricks in two parallel lines with their lengths parallel to the line of motion. This is effected by a very simple structure. Mounted over the delivery end of the belt 10 and at right angles thereto is a belt 205 whose flights lie in vertical planes and which move at right angles to the surface of the belt 10. This belt is entrained over drums which are mounted on vertical shafts 207 and 208 which are supported in bearing blocks mounted on a framework 210 supported by a heavy angle iron 212 which is mounted on the table 203, referring to Figure 8. The shaft 208 carries on its upper end a pulley 214 which is driven by a belt 216 entrained over a pulley 218 mounted on a shaft 220 and driven by an electric motor reduction gear assembly through a single-revolution clutch 222.

Returning to the belt 205, there projects outwardly from its surface three pusher blades 209, 213 and 217, which are spaced equidistantly on the belt, whose length is exactly three times the circumference of the pulley 214. The motor and single-revolution clutch assembly 222 is controlled by a feeder belt limit switch 118 positioned as shown in Figure 6, see also wiring diagram Figure 22, which is mechanically closed by a brick moving on the belt 10 past the position of the switch. When the switch is mechanically closed, the belt moves one-third its length, i.e., the pusher blade 209, referring to Figure 9, moves to position of pusher blade 213.

Also mounted above the table 203 and the belt 54 is a belt assembly similar to that just described. Referring to Figures 9 and 6, a heavy post 224 is mounted on the table 203 and carries a frame generally identified by the numeral 226. Mounted vertically in this frame 226 are three shafts 228, 230 and 232. On the lower end of the shafts 228 and 230 are mounted drums which carry a belt 234, the plane of whose flights are in a vertical position and which lie immediately above the belt 54. Mounted on the upper ends of the shafts 230 and 232 are pulleys 236 and 238 over which is entrained a belt 240. The shaft 232 is driven by a motor reduction gear assembly 242 through a single-revolution clutch 243. The belt 234 carries three plates such as 211 which move a brick such as 246 over onto the conveyor 62 as heretofore described with respect to the belt 205.

Referring to Figures 6, 8 and 9, the redirecting assemblies at the corner are independent of the pugmill belt conveyor, including the second conveyor 54. When a brick reaches the position 244, the blade 209, extending outwardly from the surface of the belt 205, moves it off the belt 10 onto the feeder belt 60. During the course of this movement, the brick does slide on the surface of the belt 10 as it continues to pass under the brick. Similarly, a brick at the position 246 is moved by the blade 211 off the belt 54.

As explained in the objects of this invention, applicants' hacker is designed to handle bricks of varying dimensions. Thus, a die may be placed over the extrusion orifice of a pugmill to produce a Roman brick whose theoretical dimensions are 1½" x 4" x 12". The width of the belts 10 and 54 is approximately 16" so that a brick of almost that length can be accommodated. Referring to Figure 6, the clearance above the pugmill conveyor belt 10, second belt 54, and the bottom of the frames 210 and 226 is in excess of 6", and can readily be increased. The thickness of the brick that the reject station will reject can be altered by adjusting the kick-off photoswitch relay 65. The at-rest position of the pusher blades 152 and 117, see Figure 6, is at the edge of the belt and the blades are slightly over 4" wide. It is evident that there will be delivered in a line at right angles to the pugmill belt conveyor two rows of bricks having their lengths parallel to each other and moving side by side, the bricks during a run being of uniform dimensions, but the pugmill conveyor being readily adjusted to accommodate runs of bricks of different lengths, thicknesses and widths.

As explained in the general description, one of the basic principles of the hacker table is turning one row of bricks over and positioning on another row. To do this mechanically, applicants bring the bricks in the row to be superimposed on the other row to a level such that the lower face of the superimposed bricks are in substantially the same plane as the upper surface of the lower course of bricks. This positioning is accomplished by feeder belts 60 and 62.

Referring to Figures 8 and 9, mounted on the table 203 are two flat-topped ladder conveyors 60 and 62. Considering conveyor 60 first, the conveyor frame consists of two spaced plates 250 and 252 which are held in suitable spaced relationship and which support six transverse shafts 254, 255, 256, 257, 258 and 259. Mounted on shafts 254 and 256 are sprockets 260 and 262 over which is entrained a flat-topped chain which includes transverse slats such as 264. Means, not described in detail, make it possible to loosen or tighten the chain ladder conveyor 60. The conveyor frame carries brackets, referring to Figure 8, such as 266, which are mounted on a shaft 268 supported on a bracket 270 mounted on the table 203. The delivery end of the frame is supported by means of two turnbuckle assemblies 272 and 274, see also Figure 9, the upper end of each of which is pivotally anchored to the shaft 255 and the lower end is pivotally anchored to a shaft 276 which is mounted by suitable means upon the angle iron 278 which rests on the table 203.

Mounted on the delivery end is a belt assembly comprising three small rollers disposed on shafts 257, 258 and 259 over which is entrained a belt 286. The small diameter of the rollers on the shafts 257 and 259 make it possible to bring the lead edge of the belt 286 close to the delivery end of the flat-topped chain 60 so that there will be very little vibration of the brick as it passes from the transverse slats of the chain to the belt. There is an adjustable idler pulley tightener, not shown. Mounted on the ends of the shafts 256 and 258 are chain sprockets 290 and 292 which are so proportioned that the belt 286 moves at the exact speed as the ladder conveyor 60.

Mounted on the other end of the shaft 256 is a chain sprocket 294 over which is entrained a drive chain 296 which is also entrained over a sprocket 298 carried by a shaft 300 of a variable speed drive assembly 302. This variable speed drive assembly 302 is driven by a chain 304 from a ratiomotor assembly 306. Referring to Figure 8, the drive shaft 300 is so related to the shaft 256 and the shaft 254 that when the conveyor frame is raised or lowered by short distances by the turnbuckles 272 and 274, the chain 296 will remain properly entrained over the sprockets 298 and 294.

The lower ladder conveyor 62 for the lower course of bricks is identical with the upper ladder conveyor 60, including the small auxiliary feed belt 308, excepting that the drive sprocket for the ladder conveyor is on the opposite side and the drive sprockets for the belt 308 are on the opposite side of the belt. Also, and importantly, this conveyor is mounted horizontally on fixed studs 310 and 312, the conveyor 62 being shorter than the conveyor 60.

Referring to Figure 8, the two conveyors 60 and 62 are shown at the correct heights for handling a standard brick.

At this point, the two feeder conveyors 60 and 62 lead to ladder conveyors on the hacking table itself, but inasmuch as the movement of the brick is continuous, except for a stop gate shortly to be described, applicants include the two ladder conveyors 66 and 64 as part of the feeder conveyor system. Pivotally mounted between the arms of the U-shaped brackets such as 303 (also see Figure 11), which in turn are mounted on shafts such as 314 and 316 which are journaled in blocks 315, 317 and 319 and 321, respectively mounted on a supporting table 301, is a conveyor frame 305. This consists of two spaced plates 320 and 322 between which are mounted two shafts 324 and 326.

The ladder conveyor 66 can be raised or lowered in order to accommodate bricks of different widths. This is manually effected by applying a crank with socket to a square stud 323 on a shaft carrying a pinion which drives a gear 325 mounted on a shaft 327. Mounted on the opposite end of the shaft 327 is a gear such as 331, see Figure 15, which engages racks such as 335, which are respectively mounted on the shafts 314 and 316. The stroke is comparatively short because the range of widths intended to be handled by the machine is two to six inches.

Referring to Figure 8, mounted between the plates 320 and 322 but on the near side of the shafts are sprockets 328 and 330 over which is entrained the ladder conveyor 66. Mounted on the top of the plate 322 is the upper course loading platform 332, referring to Figures 8 and 11, whose top surface is in the plane of the top of the slats of the ladder conveyor 66. Mounted on this table is a bracket 334 which carries an alignment cylinder 336, positioned above the ladder conveyor 66 with its piston 338 movable parallel with the movement of the conveyor. Mounted on the end of the piston 338 is a brick stop plate 340.

Disposed on the inner surfaces of the plates 320 and 322, referring to Figure 9, are two pairs of journal bearings 342, 344 and 346 and 348, the members of each pair being mounted on a common axis and holding respectively pusher pins 350 and 352. To the outer ends of the pusher pins 350 and 352 is mounted a cross bar 354 which carries two inverted L-shaped arms 356 and 358 which in turn at their outer ends carry a pusher bar 360. The top of the pusher bar 360 clears the bottom of the brick stop plate 340 so that the bar may be moved across the ladder conveyor to the dotted-line position 364 and push the brick onto the upper course loading table 332, see Figure 11. The brick are accumulated on the ladder conveyor 66 until four are in alignment and they occupy the solid-line position shown in Figure 8. Thereupon, the alignment cylinder piston 338 and pusher plate 340 push the brick to the left against the movement of the ladder conveyor 66 to the solid-line position 362 shown in Figure 14, and immediately the pusher bar 360, responsive to the shuttle cylinder 368, moves to the dotted-line position 364, see Figure 11. This movement, referring to Figure 9, is effected by a movement of the bar 354 which is connected to a piston rod 366 which operates in a front shuttle cylinder 368 which is mounted by suitable means on the front plate 320 and extends through an opening in the rear plate 322.

Continuing to refer to Figures 10, 9, and particularly 13, the lower course of bricks is carried into the hacking station by means of the ladder conveyor 64 comprising a base plate 370 which supports a frame member 372 upon one end of which is suitable mounted a transverse shaft 374 carrying a chain sprocket 376 and upon the other end in a similar assembly a chain sprocket 378. Entrained over the sprockets is the chain carrying the ladder conveyor 64 having the usual cross slats, the ends of which ride in a channel formed in elongated plates 377 and 379 mounted on member 372. The chain conveyors 64 and 66 are driven from the sprockets 377a and 385, see Figures 9, 11 and 13, by chains entrained over sprockets driven continuously by a motor, not shown.

Referring to Figure 14, mounted at the end of the conveyor 64 is a rear course positioning cylinder. This and its drive rod and brick pusher blade is collectively identified by the numeral 382. It is similar to the alignment cylinder 336 heretofore described in connection with the ladder conveyor 66.

Referring to Figure 13, a pusher bar is provided in the lower course of bricks. The pusher bar 384 mounted on arms 386 and 388 which in turn are supported on a cross member 390 having two bearings 392 and 394 adapted to permit reciprocating movement, is adapted to move to the dotted-line position 396. In so doing, a row of bricks is moved over onto the movable pattern table 70 which will be shortly described. The bar 390 is moved by a piston rod 402 operating in the cylinder 404, called the rear shuttle cylinder.

Referring to Figures 8, 9 and 10, disposed between the belt 286 and the receiving end of the ladder conveyor 66 is a stop gate assembly which is identical to an assembly disposed between the corresponding belt between the ladder conveyors 62 and 64. The front assembly is designated the front gate and the rear gate, and the rear assembly, the rear gate. Each is actuated by its own electronic eye. The electronic eyes consist of a light source 361 and a photocell 73 which is positioned immediately in advance of a gate 71, pivoted on a shaft 367, mounted on an angle iron 369, which is mounted on the side plate 250. Also mounted on the angle iron 369 is a front gate cylinder 371 in which operates a piston 373 connected by suitable linkage 375 to a pin 377 on the gate. Downward movement of the piston 373 will throw the gate into the dotted-line position 379 and permit a brick to continue on its path along the twin-row, two-level conveyor. The rear gate cylinder is designated by the numeral 381.

*The hacking table*

The hacking table is shown principally in Figures 14, 15 and 8. Referring to Figure 8, the ladder conveyors 66 and 64 have been described. The pattern table 70, which is in fact a broad chain conveyor, and the positioning arm 20 have been generally described. Referring to Figure 15, the object is to turn over the row of bricks 590 with the face uppermost over and onto the row of bricks 422, which also has the faces uppermost, so that the two faces will be together, and then to move the bricks into a pattern with air passageway between them as indicated in Figure 15. The assembly table 70 will first be described.

Mounted on the table 301 are journal bearing blocks such as 432 and 434 which support two parallel shafts 436 and 438. Mounted in transverse alignment with each other on these two shafts are sprockets such as 440 and 442 which carry roller chains 444 of which there may be three, as suggested in Figure 14 by the numerals 444, 446 and 448. Mounted on these chains are slats 450 whose edges are quite close to each other in the top horizontal plane. The shaft 438 is driven through an overriding clutch 452 actuated by an arm 454 whose outer end is connected by suitable linkage to a piston 456 actuated by a cylinder 458, called the long index cylinder. Mounted on the shank of the piston is an adjustable stop 460 which upon an upward movement engages a bracket 462 so as to exactly limit the stroke of the rod 456, and hence the forward movement of the arm and of the pattern table 70.

On the other end of the shaft 438, referring to Figure 14, is an identical drive arrangement, there being an overriding clutch 464 and a drive arm 466, whose outer end is connected to a piston 468 operated in a cylinder 470, which is not shown but its position is indicated by the dotted lead line and the numeral 470. There is a stop on this piston arm and it is adjustable and is adjusted so as to permit a shorter movement of the arm 466. This is, therefore, called the short adjustment arm.

By adjusting the stops such as 460, various types of hacks may be obtained depending on how one functions the long index cylinder and the short index cylinder. As heretofore explained, the desirable hack of nine parallel double flats is three courses narrowly spaced on each end with three courses broadly spaced in the center as shown in Figure 15. This is accomplished by initially positioning two double courses at the position of the bricks 422. Thereupon, the short index cylinder is actuated and the bricks move to the position 472. When the next double course has been positioned, the short index cylinder is again functioned and we have the first three courses of bricks as shown in Figure 15 on the left. Then, after each double course is laid on the end of the table 70, the long index cylinder is functioned four times and then this is followed by two actuations of the short index cylinder which produce the double flat spacing shown in Figure 15. The minimum spacing is controlled by the distance required to clear the outer clamp 542. The maximum spacing is controlled by the length of the table 70 and the adjustment range of the stops such as 460. In hacking Norman brick having theoretical dimensions of 2" x 4" x 12", the upper flight and the lower flight of transverse adjacent layers are indicated in Figure 26. Here, the broad spacing is under the end bricks and the narrow spacing is under the middle bricks. Applicants' hacker can handle the arrangement shown in Figure 26.

The upper course turnover stacker is shown in Figures 14, 15 and 24. Referring to Figure 24, this stacker is based upon an upright, rectangular frame comprising two shafts 500 and 502 joined at their ends by two shafts 504 and 506 tightly but rotatably mounted in bearing assemblies such as 508. The shaft 502 is mounted, referring to Figure 15, in blocks 510 and 512, which are mounted on the supporting table 301, and the shaft 500 is similarly mounted on the far side of the table in similar blocks, not shown. The entire rectangular frame, therefore, may be raised or lowered. Mounted on an upright 514 on the table 301 is a journal bearing block 516 carrying a shaft 518 (see also Figure 8) on one end of which is a gear 520 meshing with a worm 522 on a shaft 524 suitably journaled in blocks on the table 301 and having a forwardly directed square stud 526. Clamped to the side of the shaft 502 is a rack 528 which meshes with a gear 530, also on the shaft 518. A rack 532 similar to 528 and mounted on the shaft 500 meshes with a gear similar to 530, also mounted on the shaft 518, see Figure 24. By applying a crank with socket to the stud 526, the entire assembly may be raised or lowered.

Mounted on the front ends of the shafts 506 and 504, see Figure 15, are sprockets carrying a chain 509, and clamped to the shaft 502 is the turnover cylinder 511 which is double acting, that is, it has two piston rods 513 and 515 which are connected to opposite ends of the chain 509. The piston stroke is equal to one-half the drive circumference of the sprocket 517 so that on an upward movement of the piston 513, the shaft 506 will be rotated 180°. Since the chain and piston assembly are mounted on the rectangular frame which may be called the turnover carriage, raising or lowering the carriage has no effect on the operation of the piston and chain.

The four brick course clamping assembly is seen in plan view in Figure 14. Mounted on each end of the shaft 506 is a casting 533 and 534 which have laterally directed arms such as 536. These are drilled to receive shafts 538 and 540. Mounted on the outer end of these shafts is the outer clamping bar 542. Through the wall of the arm 536 is a slot 544 and a cross pin 546 is mounted in the shaft 538 and extends into the slot 544. The pin 548 and slot 550 in the arm 552 bear a similar relationship to the shaft 540. The pin 546 extends above the shaft 538 and into a slot 556 in an elongated plate 558. This plate 558 is adjustably connected at 560 to a clamp piston rod 562 which functions in the four brick clamp cylinder 564. This cylinder is mounted by arms on the shaft 506. This clamp piston rod 562 extends through clamp cylinder 564 and its other end is adjustably connected at 566 to a plate 568 having a slot 570 which is similar to the slot 556, but reversed thereto. By moving the piston 562 downwardly, as viewed in Figure 14, the piston and plates 558 and 568 moving parallel to the shaft 506, the outer clamping bar 542 will be moved to the left.

Also mounted on the shaft 506 and keyed thereto are blocks 572 and 574 which are drilled to receive shafts 576 and 578. On the outer end of these shafts are mounted the inside clamping bar 580. A transverse pin 582 mounted in the shaft 578 extends into the slot 584 in the plate 558. A similar pin 586 mounted in the shaft 576 extends into a slot 588 in the plate 568. By moving the piston rod 562 downwardly, as viewed in Figure 14, the inside clamping bar 580 will be moved to the right.

The operation of the turnover mechanism will now be described. Referring to Figure 15, when the electronic eye has admitted four bricks to each of the two ladder conveyors 66 and 64, the front and rear alignment cylinders 336 and 382 are actuated and they bring the four bricks into exact transverse alignment as shown in Figure 14. Immediately the pusher bar 360 pushes the course of four bricks from the position 420, see Figure 15, onto the holding table 332 at the position 590. At this moment, the turnover arm assembly is in the dotted-line position 592. Simultaneously, the pusher arm 384 pushes the course of bricks 426 onto the pattern table 70 at the position of the lower course of bricks at 422. Thereupon, the turnover cylinder 511 completes a movement of the piston rod 513 downwardly to the solid-line position shown in Figure 15. Immediately, the four-brick clamp cylinder 564 functions and the clamping bars 542 and 580 clasp the four bricks on opposite sides. Thereupon, the turnover cylinder 511 is actuated in the opposite direction and the row of bricks 590 are positioned on the lower course of bricks on the pattern table, that is, above the position 422 which is identified as position 519. Thereupon, the four-brick clamp cylinder 564 is positively actuated in the opposite direction, releasing the clamps 542 and 580, and the turnover cylinder 511 reverses direction and performs a partial turn of the arm to position 592, see Figure 15, which is a dwell position.

Describing now the electrical controls responsible for handling the bricks from the time they move up the two feeder ladder conveyors 60 and 62 to their arrival in a flat on the table, and referring to Figure 22A, a brick moving up the ladder conveyor 62 interrupts the light from the bulb 361 to the photocell switch 73 which impulses these signals through a stepping switch 227. The switch is so connected to the gate relay 229 that on every fourth impulse, there being three normally open pairs of contacts 231, 233 and 235, the gate solenoid 237 will be actuated and this operates on air valve controlling the cylinder 371 to close the gate 71, see also Figures 10, 8 and 9. This holds back any further bricks on the conveyor 60. The second pair of contacts 231 of the gate relay 229 shunts out further control by the gate photoswitch 263, holding the stepping relay 227 inoperable.

The circuit for admitting four bricks only from the ladder conveyor 62 to the conveyor 64 on the hacking table is identical with that just described and returning to Figure 22A, it should be noted that the second contacts 233 of the gate relay 229 is in series with the No. 3 contact of gate relay 239 so that when gate relay 239 has been energized through the same procedure as gate relay 229 from the passage of four bricks being fed thereto from the feeder belt 62, then a circuit is established to the timer 241, to shuttle cylinder solenoid valves 243, which simultaneously function the front shuttle cylinder 368, see Figure 9, and the rear shuttle cylinder 404, see Figure 13, and simultaneously the bricks in the solid-line positions 420 and 426 in Figure 15 are pushed over to the dotted-line positions 590 and 422.

Returning to Figure 22B, upon completion of the travel of the shuttle cylinders 368 and 404, the shuttle cylinder limit switch 245 having normally closed contacts is first opened and this drops out the gate-holding relay 247. This opens the circuits through both the gate relays 229 and 239 with the result that the gate solenoids 237 and 248 respectively close the valves, not shown, to the cylinders such as 371, see Figure 10, thereby moving the gates such as 365 to the position 379. This permits bricks from the feeder ladder conveyors to again flow onto the ladder conveyors 66 and 64 to duplicate the process which has just been described.

Upon each closing of the shuttle cylinder limit switch 245, a current moves through the conductor 249 which momentarily energizes the unlatch turnover solenoid valve 253. The closing of the turnover index limit switch 251 advances the stepping switch 261 once. The switch 261 is a standard unit having 12 positions. Applicants are using only nine and the detailed structure of the operation is not necessary as one skilled in the art and told what is wanted can hook up the switch.

Recalling that the rows of bricks on the pattern table 70 are to be spaced first by two narrow spaces, then by four broader spaces, and then by two narrow spaces, as shown in Figure 14, the output of the turnover index limit switch 261 is so connected to a short index relay 263 and a long index relay 265 that upon the first closing of the shuttle cylinder limit switch 245, the short index relay 263 will be energized. This closes the circuit to the double acting short index valve 267 which admits air to the short index cylinder 470 which drives the piston upwardly and moves the pattern table 70 to the right by a short stroke. After two such cycles, there follows four cycles similarly actuating the long index relay with its long index valve 269 which similarly functions the long index cylinder 458, piston 456 and arm 454, see Figure 15. On the end of the stroke, the piston such as 456, long index limit switch 271 is closed which actuates the second solenoid 273 of the double-acting long index valve 269 to return the piston rod immediately and positively to its unactuated position shown in Figure 15. The short index limit switch 275 functions similarly.

The foregoing description has described how the lower flat of bricks in Figure 15 is built up. This is a little ahead of the actual operation because the row of bricks at position 590 is moved over to position 519 by the turnover assembly as each row is built up on the pattern table. This will now be described, and again referring to Figure 22B, when the limit switch 245 closes, a circuit is closed to the unlatched turnover valve 253 which actuates the unlatched cylinder 279 which releases a pawl 280 in engagement with a shoulder 281 on a cam 282 disposed on the shaft 506, see also Figure 15. At the time that this occurs, the turnover cylinder 511 has air pressure upon it urging the turnover assembly, referring to Figure 15, from position 592 down to the solid-line position there shown. The arms 536 move to this position and close turnover clamp limit switch 283, which is physically positioned, referring to Figure 15, at a point 284. Returning to Figure 22B, when this limit switch is closed, the clamp solenoid 285 is energized and this admits air to the clamp cylinder 564, which referring to Figure 14, moves the clamping pawls 542 and 580 into clamping position on the line of bricks indicated by the dotted line. In so doing, the piston closes the clamp limit switch 287, which physically is positioned on the turnover assembly so that it will be actuated by the piston 562, referring to Figure 14, and this establishes a circuit, returning to Figure 22B, through the turnover valve solenoid 288 which actuates the turnover cylinder 551 in the opposite direction, that is, referring to Figure 15, the piston 513 moves upwardly, and the shaft 506 in a clockwise direction.

Returning to Figure 22B, the arm 289 on the shaft 506 opens the turnover index limit switch 251 which has been closed from a previous cycle and then closes turnover unclamped limit switch 291. This switch 291 is closed when the turnover assembly reaches the dotted-line position 295 in Figure 15. By closing the switch 291, the circuit is closed through the unclamped solenoid valve 297 which actuates the clamping cylinder 564 in the opposite direction positively and releases the brick at the position 519 in Figure 15. As the piston 562 moves to the position shown in Figure 22B, it closes the clamp limit switch 299 which actuates the return valve solenoid 307 which positively reverses the direction of the chain 519, Figure 15, causing the turnover assembly to return to normal position 592, being held by the pawl 280. Long before this operation has been completed, the shuttle cylinder limit switch 245 has again opened, thereby de-energizing the unlatched turnover valve 253, which thereby releases the pawl 280.

Figure 22B:
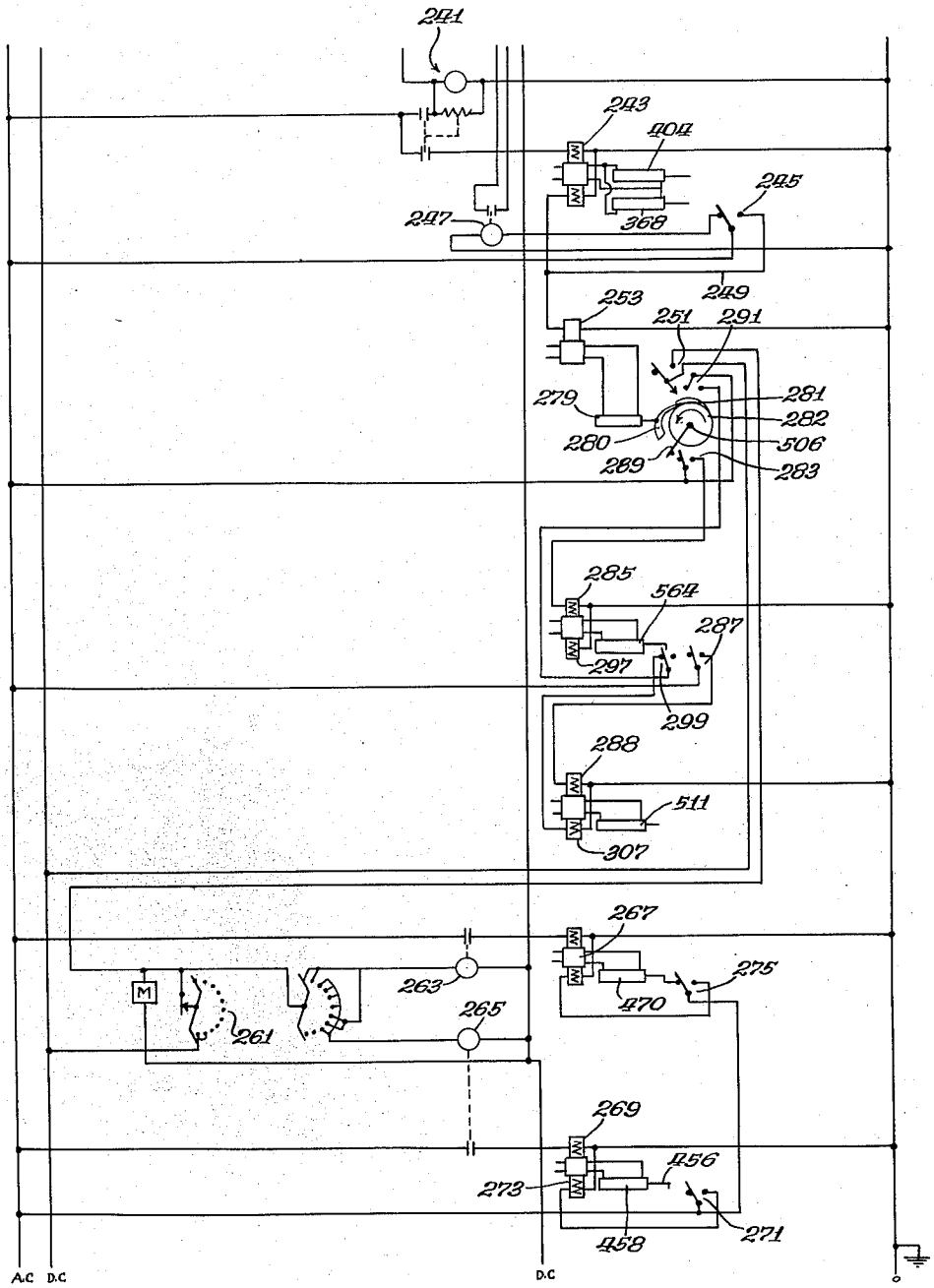
Figure 22C:
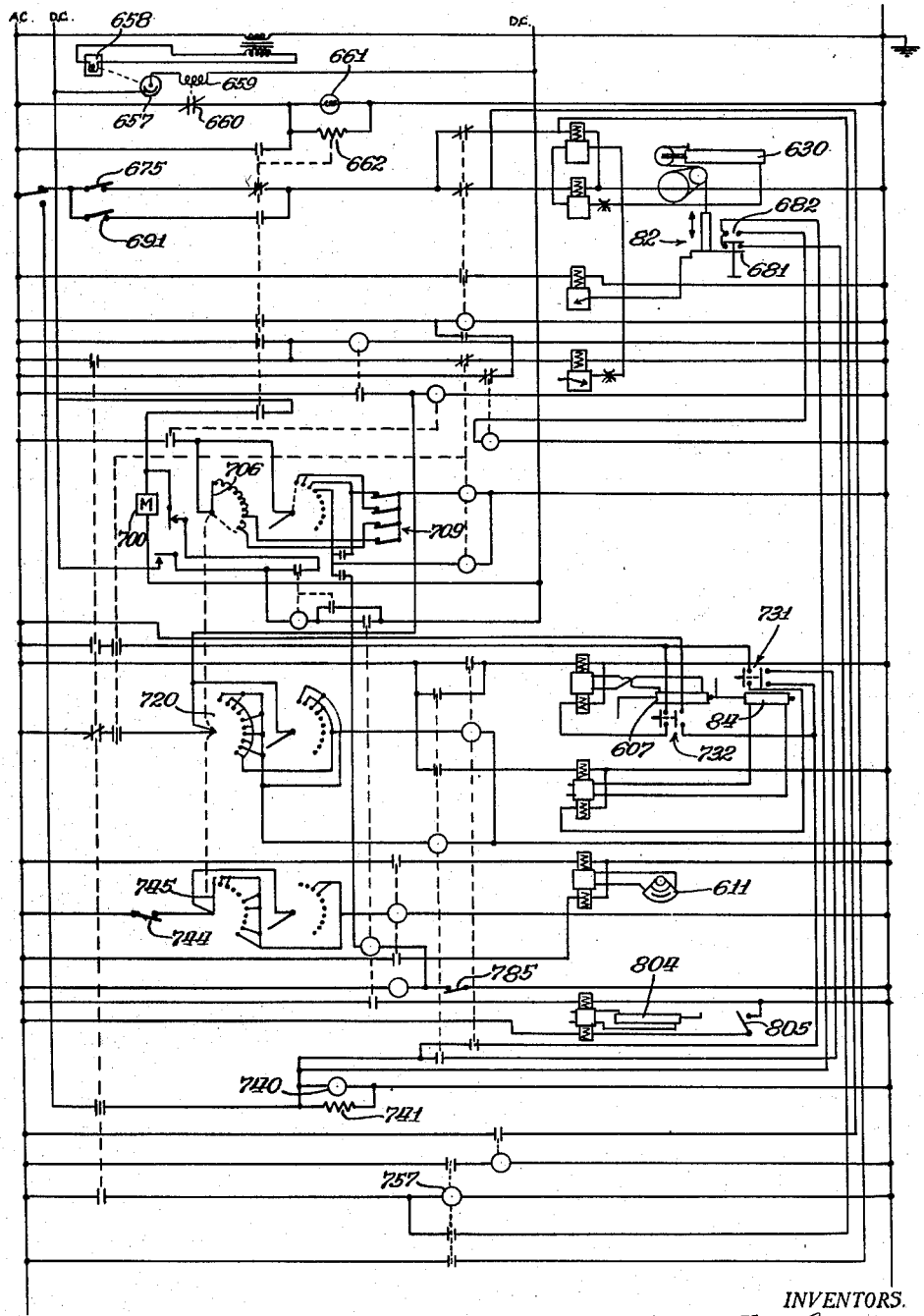

Continuing to refer to Figure 22B, when the shaft 506, whose arms are represented by the line 289 which had closed the turnover unclamped switch 291, commences to return in a counterclockwise direction, it opens switch 291, but momentarily closes turnover index limit switch 251. This energizes the index stepping switch 261, whose sequence of operations have heretofore been described.

*The hoisting transfer*

Referring to Figure 16, the hoisting transfer comprises a travel carriage 82 suspended from wheels 600 and 601 from parallel I-beams 602 and 603. The carriage is connected at the right-hand end to a piston 604 driven from a cylinder 84 which forms the main frame of a carriage suspended by rolls such as 605 from the I-beams 602 and 603. This entire cylinder carriage 84 is connected to a piston 606 functioned from a cylinder 607 rigidly fastened to the I-beams 602 and 603. The carriage 82 comprises two facing T-beams 608 and 609, see Figure 17, held in spaced relationship by suitable cross members. Positioned between and movable vertically thereof is a hoist carriage 85 from the lower end of which depends a shaft 610 which extends below the bottom of the travel carriage 82 and from which is suspended a brick-holding battery of tongs 86. The shaft 610 is connected at its upper end to a hydromotor 611 which is set to rotate the shaft 610 back and forth in a 90° arc, but on a one-stroke cycle in each direction. It follows that the battery of tongs 86 can be moved from the position shown at 86 to the position shown at 612 by a single function of the hydromotor 611.

The purpose of the twin cylinders 84 and 607 is to provide two exact positions for the carriage 82 along a line at right angles to the pattern table 70, see Figure 1. As illustrated in Figure 16, the bench car 88 moves on a track 613 which is at right angles to the line of movement of the travel carriage 82. Attention is invited to the cut-away portion 500. In fact, the cylinders 84 and 607 are positioned far to the right, as illustrated in Figure 1, so that when both pistons 604 and 606 are fully drawn within the cylinders 84 and 607, the tong assembly 86 will be at the position 501, and when the piston 64 is fully extended from the cylinder 84 with piston 606 fully within cylinder 607, the tong assembly will be at position 502.

It follows that on any movement from position 612 to 502, in either direction, only the long fixed cylinder 607 is functioned. Rubber buffers 503 and 504 are provided to soften the impact at the end of a stroke of the two pistons 604 and 606.

The purpose of the travel hoist is to pick up nine double rows of brick 615, 616, 617, 618, 619, 620, 621, 622 and 623, from the pattern table 70 in that short interval of time when the turnover assembly is clear of the table 70. The tong battery, without rotation on its vertical axis, places the double flat 624 in position first and then the double flat 625. After it picks up the next double flat on the pattern table, the hydromotor 611 turns the tong battery 86 90° and positions the double hack at 626. On the return movement, the hydromotor turns the tongs back 90° so that another double flat may be picked up. The next double flat is then positioned at 627. This is continued until seven double flats of brick have been stacked in two hacks on the bench car.

The means for raising the hoist carriage 85 is a hydraulic cylinder 630 mounted horizontally in the travel carriage 82 and carrying a piston 631. The piston 631 carries a pair of sprockets 632 at its outer end, and entrained over the sprockets 632 are chains 633 anchored at 634 and also entrained over sprockets 599. The lower ends of the chains are connected to the hoist carriage 85 at 635. The cylinder 630 is a single acting cylinder as the weight of the carriage is sufficient to move it downwardly at a speed desrided.

Figure 18:
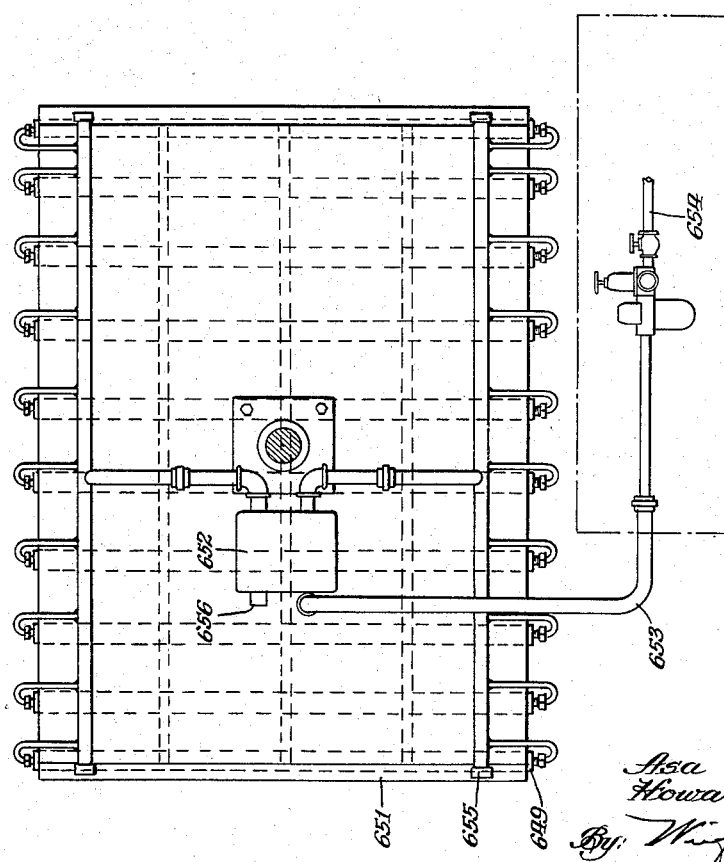
Figure 18 is a detailed plan view of the lifting tongs attached to the transfer crane.

Referring to Figures 18 and 19, the battery of tongs comprises nine pairs of plates, each pair to clasp two rows, one on top of the other, of four bricks each. Where the machine is to hack the longer Roman bricks, the tongs will be suitably longer, a separate battery being mountable at the base of the hoist carriage 85. Similarly, where the machine is to hack Norman brick having a theoretical thickness of 1½", the blades or jaws on each pair of tongs will be appropriately closer together. Here again, a separate battery of tongs is supplied. In short, the jaws of each pair of tongs are to be a comparatively short stroke and this necessitates a separate battery of tongs for each different shape of ceramic being used.

Referring to Figure 19, bolted to the bottom of the shaft 610 is a rectangular frame 637 from which are pivotally suspended a plurality of pairs of jaws such as 638, each pair being spaced from the adjacent pair by a tubular expandable member 639 which is a form of rubber hose, and the outer jaw of two end pairs such as 640 is spaced from a fixed wall 641 on a second frame 542 rigidly spaced from the first. The length of each jaw, referring to Figure 16, is slightly less than the length of the bricks so that where the tong battery is to pick up nine rows of four bricks each, it will possess 36 pairs of jaws. It is important that each brick in a lower flat be clasped individually. If the jaws extended the full width of all four bricks, any irregularities in the thickness of the brick or in the straightness of the jaws might result in the brick being dropped.

Returning to Figure 19, the lower portion of each jaw has an offset at 643 so as to provide a purchase surface against the brick which is less than the side surface of the brick. The upper brick is not clasped. Its position is maintained by resting on the lower brick.

Each pair of jaws is held by springs such as 645 normally open, and the spacing is shown in the dotted-line positions 646 and 647. As the jaws come down, referring to Figure 16, over the pattern of bricks on the table 70 there is a clearance on each side of each brick of about five-sixteenths of an inch, which means that the travel carriage and the hoist carriage must be accurate in their horizontal and vertical movements to about five-sixteenths of an inch at the lowermost point of the tongs.

A rubber expansible member 639 extends the full length of the tong carrier frame 637 and is sealed to a fitting which provides an air inlet such as 649 and an air exhaust such as 650. Referring to Figure 19, there is shown a plan view of a frame member 651 carrying a clamp valve 652 which is supplied by a flexible conduit 653 from an air source 654, the latter being mounted on the building wall. Air under pressure is led to one header 655 which through separate lines is connected to each fitting such as 649. When the valve is opened and an exhaust valve 656 is closed, the rubber expansion members 639 are expanded to the position shown in Figure 19 so that the bricks are clasped. On release of the air, the spring such as 645 returns them to the dotted-line positions such as 646 and 647.

As in the description of the hacking table, the fluid, whether air or liquid, connections to the operating cylinders are not shown. This is a problem in routine hydraulics and involves problems of speed and positiveness of the reaction of the cylinder, which need not be investigated here.

Returning to Figure 16, the descent of the tong assembly must be very accurately controlled so that it does not damage the pattern table on its descent or damage the bricks already in the hack on the bench car 88. In the controls shortly to be described, the tong assembly is brought down rapidly to a position an inch or two above the bricks on the pattern table 70, where it is brought substantially to a full stop. Thereafter, it is lowered at a somewhat slower speed. Figure 19 shows that the bottom edge of the jaws is about one-half inch above the bottom of the brick, i.e., the top of the table. The same procedure is followed when the green bricks are being lowered onto the hack. The problem is considerably complicated because the initial downward stroke must be automatically varied in accordance with the height of the hack upon which the pattern table flat is to be placed. In the controls that follow, there is only one electronic eye which initiates the entire movement. This eye bears numeral 657, in Figures 16 and 14. When the double flat closes the circuit in which the photocell of this electronic eye is located, the double flat is automatically moved to its proper position on the bench car 88. Also, when the two side-by-side hacks 658 and 659 are completed, the bench car 88 is automatically moved forward and two new stacks are commenced at position 90, see Figure 25.

*Bench car loading*

Automatic loading of the bench car is achieved under control of a preferred transfer-control and cycling-circuit means such as shown in Fig. 23, the general purpose of which is to produce a certain sequence and pattern of movements of the hoist, tongs, transfer carriage and bench car whereby the tongs will be caused to seize each full stand or pattern of brick (i.e. 72 bricks in double flats) delivered upon the pattern table, and transport, orient, and deposit the same in stacks on the bench car to build up thereon a certain number of hacks in accordance with the requirements heretofore described in view of Fig. 1.

More particularly, each complete operating cycle of the transfer means will involve up and down displacements of the tongs hoist; closing and opening of the tongs; far and near excursions of the transfer hoist; and certain intermittent 90-degree turnings of the tongs to stagger the sets of flats axially crosswise of each other for the reasons previously alluded to.

For descriptive convenience, the expressions "transfer cycle" and "operating cycle" will be used interchangeably to mean that cycle of operation of the transfer means and appertaining control circuits and instrumentalities which shall cause the seizure, transport and deposit upon the car of a full stand of brick from the pattern table; and the term "sequence" will be used to mean each series of fourteen transfer cycles needed to build up two complete hacks on the bench car inclusive of the advance of the car into position for the next sequence to receive two more hacks, and so on until its load of six full hacks is completed.

Referring now to Fig. 23, each transfer cycle is initiated by the deposit of the ninth course of bricks (in double flats) onto the pattern table 70, which is tantamount to the arrival of a full row of bricks at the far end of said table, such arrival resulting in interruption thereby of light directed across the end of the table from lamp or source 658 onto a photoelectric means 657 (conveniently a photoconductive cell), and the consequent dropping out of a photoelectric trigger relay 659 otherwise normally pulled in, whereby the closure of the normal contacts 660 of said relay will start the primary transfer timer motor 661 and simultaneously energize a clutch coil 662 therefor via conductors 663 and 664, so that certain timing circuits will be set up in sequence through operation of ganged wipers driven by shaft means, indicated schematically at 665, through conventional clutch means (not shown) held in by said clutch coil.

A cycle-holding circuit is set up at once for the timer motor by closure of timer contacts 666, which shunt power via conductors 667 and 668 around the starting circuit initially set up through said normal contacts 660, since the trigger relay will promptly pull in again following removal of the load from the table by the tongs, the latter now being caused to descend from their first or high stopping position above the table, at which the tongs hoist was stopped (by the first or high limit switch 675) at the conclusion of a previous cycle.

Descent of the hoist to lower the tongs to the last stopping position at the table level, is effected by energization of both of the lowering solenoid valves 669 and 676 via their respective conductors 670 and 677 through the normally closed clamp relay contacts 671 and 678 conjoining with conductor 672, connecting through timer contacts 679, now closed, and the closed lower limit switch 691, and contacts 763A on the carriage return limit switch.

When the tongs are substantially at the level of the table, the lower limit switch 691 opens (as do timer contacts 679 shortly thereafter) stopping the hoist in readiness for clamping the tongs onto the load.

Seizure of the load is effected next by operation of hoist clamp relay 684 by power supplied from conductor 688, timer contacts 690 now closed, and line conductor 689, with contacts 686 on this relay now closing to energize the tong clamp solenoid valve 652 via conductor 687, whereupon the tongs clamp home upon the entire stand of bricks and are maintained in this condition by a clamp holding circuit closed at contacts 685 of the clamp relay.

Following immediately upon the aforesaid operation of the clamp relay, the primary transfer timer will next close in quick succession the remaining two of its sets of contacts, 693 and 699, the former setting up a circuit to pulse the stepping switch coil 700 in readiness for the subsequent travelling of the hoist carriage, while closure of the latter contacts 699 effects energization of the first step switch relay 695 from conductors 692, 694, which in turn results in closure of the contacts 697 of this relay to actuate a second step switch relay 698 from power conductor 696 to control the raising of the hoist preparatory to said carriage travel.

The aforesaid pulse circuit through timer switch contacts 693 applies power to step switch coil 700 via conductors 701, 702, thus causing the step switch to take the first of an ultimate total of fourteen steps which will be involved in completing one hacking sequence. This first step lodges wiper 706 in the first contact bank upon the first of eight looped contacts 707A . . . 707H, which results in connecting power via conductor 708 to the first level limit switch 709A located (with three others like it) for operation by cam means (not seen)

coacting with a hoisting sheave on the tongs hoist as indicated at 709 on the latter.

It may be observed here in passing that in the illustrative embodiment of the step switch means depicted in Fig. 23, there are three banks of stationary contacts each served by two stepping wipers (for extended range), all of which are stepped in unison as indicated by the dotted-line interconnection thereof.

Upon closure of the final contacts 699 of the timer as aforesaid, the hoist will rise just sufficiently to clear its load of the table top as a result of energization of the hoist raise valve 713 via feed conductor 692, said contacts 699, a jumper 769, to conductor 715 which connects through the normally closed contact 712 of the first hoist raise valve relay 711, so that the valve means 713 operates to cause the hoist to rise until it encounters a hot level switch 709, in this instance the first level switch 709A rendered effective by the last-mentioned operation of the step switch in lodging wiper 706 on the first one of the eight looped contacts 707A.

Upward movement of the hoist will be arrested by closure of said limit switch 709A owing to energization via 710 thereby of the hoist raise relay 711, which interrupts the aforesaid valve circuit through closed relay normal contacts 712 to close valve means 713 again and hold the hoist at the corresponding level during the ensuing excursion of the travel carriage 82.

When the first step relay contacts 697 are closed as aforesaid, power from feed conductor 696 is applied not only to the second step switch relay, but also to the second-bank wiper 720 via conductor 784, and since this wiper is now resting upon its first contact 721A, the second carriage travel relay 724 pulls in via conductor 723, closing its contacts 725 to energize the second carriage travel valve 727 via conductor 728, and closing contacts 726 to actuate the first carriage travel valve 729 via conductor 730, thereby admitting air to both cylinders 84 and 607 to drive the carriage to its farthermost position over the bench car by the additive driving displacements of both rams.

During both the first and second outbound trips of the carriage 82, the hoist will be pivoted about its vertical axis to turn each of the first two loads (while maintaining them in their original horizontal plane) 90° in azimuth from their original starting positions on the pattern table, this operation being effected during the brief interval between departure and the arrival of the carriage at the car.

Accordingly, as the carriage begins to move from the table, the hydromotor 611 will be actuated at once by reason of the consequent actuation of a one-way turn valve switch 744 on the carriage which connects power to a third wiper 745 at this time resting on the first of two looped contacts 746A, 746B in the third bank of the step switch, thereby energizing, via conductor 747, a turn valve relay 748 to close contacts 749 of the latter and apply power via conductor 750 to one winding 751 of a solenoid control valve means for the hydromotor, the quadrantal turn of the hoist thereby effected being complete with arrival of the load over the bench car.

As an incident to the arrival of the carriage at its outermost station, the secondary timer motor will be given a starting impulse as a result of the closure of contacts 731A on first carriage travel limit switch 731 (engaging with its operating pin 731P) thereby applying power from feed conductor 790 to conductor 733 and thence via jumper 733A, contacts 732A on the second carriage travel limit switch 732 (closing upon engagement with its operating pin 732P), conductor 737, the contacts 734 of the second carriage travel relay, and conductor 735 to energize motor 740 and the clutch coil 741 of the secondary timer means, the contacts 742 of which at once close a cycle-hold-in circuit for said motor and clutch members, the primary timer motor and clutch means 661, 662, being now dropped out at primary starting timer contacts 666 marking the completion of the first operating cycle thereof upon arrival of the carriage at the car with actuation of the limit switches 731, 732 as aforesaid.

Deposit on the car of the first load of brick (turned 90° as aforesaid) follows next with a lowering of the hoist effected by closure of secondary timer contacts 755 energizing, via conductor 756 a second hoist lowering valve relay 757 with consequent closure of its sets of contacts 758, 759, and 760, the contacts 758 setting up a holding circuit for this relay from conductor 761 to junction 756A; contacts 759 energizing the hoist lowering valve 669 via conductor 764 conjoining with conductor 670 at 670A; while the second lowering solenoid valve 676 is energized through time delay contacts 766 and conductor 767 to junction 677A, so that the descent of the hoist will at first be rapid, but very shortly thereafter be slowed substantially as one solenoid valve 669 is caused to drop out again responsive to engagement of the feeler means 680 with the car thus releasing the hoist lowering valve relay 757 from its holding circuit through conductor 761 at feeler contacts 681 to open said valve while the slower hoist descent continues briefly under control of the remaining solenoid valve 676, which will also drop out quickly thereafter when the delay relay operating contacts 760 open as aforesaid.

Following promptly after the opening of feeler contacts 681, a companion set of normally open feeler contacts 682 will close and energize the hoist clamp release relay 770 from conductor 736 via conductor 683, and this in turn opens the normally closed contacts 771 of the latter relay to disconnect holding power from conductor 722 through clamp relay holding contacts 685 which have maintained the grip of the tongs, so that the latter are now caused to let go and deposit on the bench car a first load of 72 bricks still arranged in double flats but now turned through a right angle from their starting condition on table 70.

The hoist is raised for the return trip by closure of secondary timing switch contacts 716 to energize the hoist raise solenoid valve 713 via a circuit through conductor 715 and the normally closed contacts 712 of the first hoist reverse valve relay.

The last-mentioned circuit will also energize the first step switch relay 695 from jumper 769 between conductors 715 and 694, so that the second step switch relay 698 will also pull up through contacts 697, again closing contacts 703 to make the first-bank wiper 706 hot, along with the limit switch contact 709A, the latter being closed by the rising hoist at the corresponding level, so that once again the hoist raise valve relay 711 will pull in to open contacts 712 and drop out the solenoid raise valve 713, thereby stopping the hoist in elevated condition for the return journey of the carriage.

It may be observed here that the last-mentioned operation of the first hoist raise valve relay 711 also causes closure of contacts 718 in series with the second bank wiper 720, as well as closure of another set of contacts 780 connecting power through secondary timer contacts 781 (closed) conductors 782 and 783, to the two sets of carriage reverse travel contacts 731B and 732B (now closed by carriage travel), which respectively connect their corresponding reverse solenoid valves 727R, 729R for actuation by closure now of timer contacts 781 whereby the carriage-travel pistons work reversely and the carriage is returned to home position with the hoist and tongs disposed over the pattern table in readiness for the next load.

As the carriage retreats from the car, it closes a one-way reverse turn valve limit switch 785, thereby energizing the reverse turn valve relay 786, closing contacts 753 to energize via conductor 752 the return solenoid valve 751R of the hydromotor, which will effect restoration of the tongs to normal pivotal condition by the time the carriage can return to its starting position.

On returning to the pattern table, the carriage will actuate a return carriage limit switch 763 to break the power circuit to holding contact 742 for the secondary transfer timer motor and clutch means, dropping out the latter in readiness for the next operating cycle, at limit contact 763B.

The carriage will also actuate the carriage return limit switch 763 to reconnect power at contact 763A to the two lower limit switches 675 and 691; and since both of the latter will be closed at this time, as will also be the two clamp relay normal contacts 671, 678 to the lowering valve solenoids 676 and 679, the latter will be automatically energized to lower the hoist toward the pattern table again to the first (upper) limit at which the limit switch 675 will be reopened to hold the tongs at this upper level until such time as the photoelectric trigger means shall again be actuated.

Assuming now that a second stand or pattern of 72 bricks is completed by arrival on the table 70 of the ninth row of flats to complete a new load, the second transfer cycle would be initiated by the photoelectric triggering means as before, and the transfer apparatus would go through substantially the same sequence of operations as in the first cycle just described—with one notable variation, namely: that this time the carriage will be travelled only the short range in order to deposit this second load at the near side of the bench car instead of at the far side as was the case in the preceding cycle.

This shortened carriage travel occurs for the reason that when the stepping switch takes its second step, the second-bank wiper 720 will lodge upon a second contact 722A which is looped with every alternately-appearing contact thereafter to conductor 850 connecting via conductor 852 to the first carriage travel relay 854, the contacts 856 of which can connect power only to the solenoid valve 729 for the short-run first carriage travel cylinder 84, the second carriage travel relay 724 having no operating connection in this second cycle, so that the carriage is driven only through the shorter distance covered by the one pneumatic ram.

A further variation occurring in this second transfer cycle resides in the fact that the secondary timer motor is not started by the second carriage travel relay contacts 734 as in the preceding cycle, but by a different set 858 (actuated by the first carriage travel relay 854) under supervisory control of the first carriage travel limit switch 731 in closing its contacts 731A upon arrival of the carriage at the near delivery position, the distance to which corresponds to the distance the carriage will be driven by only the one ram before the actuation of said switch 731 by pin 731P.

In all other respects the second transfer cycle will be the same as the first one.

However, in the ensuing third transfer cycle, the sequence of operations described for the first cycle will be repeated with the important functional variation that the hoist will not be turned (oriented) during either the far or near excursions of the carriage, the hacking array requiring that the second (double flat) layer in both hacks on this deposit shall be laid with the long axes of the bricks at right angles to those in the rows immediately below.

To this end it will be observed that in the third bank of stepping contacts, the two contacts 746C appearing after the first two turn valve relay contacts, 746A, 746B, are left unconnected, from which it will be understood that on the third and fourth steps the turn valve relay 748 will not be operated at all.

But in the next succeeding two cycles, two more of the turn valve relay contacts at 746D are connected to actuate the turn valve relay so that the hoist will be turned again during the 5th and 6th cycles. This alternate omission of turning valve operation in every other two-cycle phase of the carloading operation is carried on through the entire 14 steps of step-switch sequencing necessary for the building of two hacks.

Each hack delivered upon the kiln cars is intended to contain seven double flats; two hacks will be laid before the car is advanced; one flat is deposited for each transfer cycle; therefore 14 transfer cycles are required to build two hacks. Accordingly, the step-by-step sequence control means utilizes 14 contacts in each of the three banks of contacts of the step switch contact arrays served respectively by the three pairs of wipers 706—706X, 720—720X, and 745—745X. After taking 14 steps, said wipers will be automatically stepped back to starting position by means hereinafter described.

The only remaining variation in operation of the transfer control means during any 14-step sequence of the step switch means relates to which of the four hoist raise limit or levelling switches 709A . . . D will be utilized from time to time.

As the levels in each hack build up to the seventh and last set of double flats deposited, the hoist will have to raise the tongs correspondingly higher to clear the tops of the bricks previously deposited.

It will be recalled that in the first two transfer cycles described above, the first two tong loads delivered to each of the near and far positions in starting the first two hacks were deposited directly upon the floor of the car, and that only one hoist raise limit switch 709A was employed in those operations. Moreover, it will also be recalled that this same limit switch is connected via conductor 708 to the first eight looped stepping contacts 707. Therefore, the one limit switch 709A serves to control the upward leveling of the hoist for the first four loads delivered into any hack. The remaining three double (near and far) loads are served by limit switches 709B, 709C, 709D.

Because of the fact that the surface of the pattern table 70 is substantially above the level of the floor of the bench cars, the hoist needs rise from the table only a clearance distance for the first four loads or eight cycles; but thereafter with the rising height of the hacks, the hoist must move to substantially higher levels for the remaining trips.

The foregoing sequence of control operations of the transfer means will be repeated for every 14 operating cycles of the carriage-hoist-tongs mechanism hereinabove described in connection with the building of one set of two complete hacks on the bench car.

Each car is loaded in three stages, each stage requiring the movement of the car into and out of one of said positions, two hacks being laid in each position until the car's capacity of six hacks is reached, whereupon another car is moved into position and the loading operations are repeated.

Thus, the step switch means controls, in cooperation with the other relay and circuit instrumentalities set forth, the building of two full hacks and the advancing of the car in every fourteen-step sequence, at the conclusion of which the step switch means resets for the following sequence, and so on, it being evident therefore that the completion of each sequence is marked by an advance of the bench car and a resetting of the step-switch means, which will next be described.

Assume now that 14 transfer cycles have been completed (corresponding to completion of two full hacks) and that the wiper 706X is therefore left standing on the 14th and last contacts 707E, the carriage having been returned to starting position as in the previously described cycles, the usual closure by the carriage of the return turn valve limit switch 785 will energize the return turn valve relay 786 and also connect power at 787 to one side of the step switch homing relay 788, the remaining terminal of which is connected via conductor 789 through a pair of normally open contacts 790 on the second hoist raise valve relay 794, and thence via jumper 791 to the 14th contact button in the first bank of the step switch. Since the wiper 706X now stands on said 14th contact, the second hoist raise valve relay 794 will pull up via conductor 793, and its junction 792 with said jumper 791 to the 14th contact button, thereby closing said relay contact 790 and causing the homing relay 788 to pull up as well, the latter event effecting advance of the bench car and a return stepping of the step switch; the car advancing operation will be described first.

Energization of the homing relay 788 as aforesaid closes its contacts 800 thereby connecting power from feed conductor 801 via conductor 802 to energize the car advance solenoid valve 803 which will admit fluid to cylinder 804 to move the bench car forward through its unidirectional drive-coupling, see Fig. 25, to the next hacking position, upon reaching which the car actuates a cylinder reverse switch 805 to close the energizing circuit from conductor 806 for the reverse cylinder valve solenoid 803R the opposite terminal of which is connected to the feed line 807. The advance valve means 803 is dropped out upon homing of the step switch and consequent dropping of the homing relay after it has started the resetting operation now to be described, and which is understood to have been going forward in the interim during which the advance of the bench car was being effected.

Reverting to the condition of the stepping switch at the time the wiper 706X lodged upon the 14th contact 707E to pull in the second carriage return valve relay, which in turn pulled in the homing relay 788, the latter at that time closed another of its sets of contacts 810 thereby energizing via conductor 811 the off-normal stepping relay 812 which connects via conductor 813 and junction 814 with conductor 815 to the now closed open normal switch 816 which in turn connects with the supply conductor 817, thereby causing the off-normal relay 812 to pull up and close its own holding circuit at its contacts 818 and also to close its contacts 819 and complete the stepping circuit from the off-normal switch conductor 820 via conductor 821 to the interrupter switch 822 and apply power to the step switch coil 700 at 702. Each step of the now-energized step switch will open the interrupter switch 822 and sustain the stepping action until the several wipers reach the normal starting position, at which time the on-normal switch 816 will open again and stop the stepping action by dropping out the off-normal step relay 812.

In the meantime, reverting again to the condition of the wiper 706X on the 14th and last step switch contact 707E, the fourth and last hoist raise limit switch 709D was energized via conductor 791 at 792, the previously-mentioned and now-closed carriage return valve relay contacts 796, and jumper 795, thereby energizing the first hoist return valve relay 711 necessary to the return of the carriage on this 14th and last trip of the sequence.

As the carriage returns to starting position relative to the pattern table, the return limit switch 763 opens the power circuit at 763B, thereby cutting out the power from conductor 743 to the holding contacts 742 for the secondary timer switch means to conclude the cycle of the latter.

When the carriage limit switch 763 is actuated as aforesaid, its contact 763A is closed again thus completing a circuit through the hoist lowering limit switch 675 and primary timer contacts 673 to energize both of the lowering valves 669 and 676 again until said limit switch is opened, thereby leaving the tongs at the first or uppermost stopping position above the pattern table in readiness for completion of the next stand of brick and actuation of the photoelectric triggering means to start another hacking sequence.

The foregoing completes the description of the apparatus. It is important to bear in mind that adjustments of the machine to accommodate different size green bricks are necessary, even where the product is a standard theoretical 8" x 4" x 2" brick. Clay shrinks during burning, and the degree of shrinkage depends upon the particular source of the clay, or more exactly, upon the composition of the clay. Thus the clay from one pit may have comparatively low shrinkage and the green brick would have actual dimensions of about 2" x 4" x 8¼". This brick would burn to the required size of 1¾" x 3¾" x 7¾". There are clays wherein the burning shrinkage is a full inch for an 8" brick, which means that the green brick must be 8¾" long with its other dimensions correspondingly greater. This is mentioned so that it will be understood that the adjusting of the inclined conveyor 60 of Figure 8, of the assembly carrying the conveyor 66 on the hacking table, same figure, of the clamping jaws 542 and 580, see Figure 14, and of the turnover assembly, see Figures 24 and 14, is not merely for handling different size burned products, but to accommodate for variations in clay shrinkage in order to get a correct uniform final product from different types of clay.

Where in this specification and in the claims appended hereto the word "edge" is used in conjunction with a conveyor, such term is intended to include the boundaries of the conveyor formed by the roller around which the conveyor runs.

Having thus described our invention, what the applicants claim is:

1. A machine for hacking elongated ceramic articles into a flat comprising a frame, an endless pattern conveyor having an upwardly open horizontal flight mounted on said frame, said pattern conveyor having a substantially flat surface, means adjacent the lead edge of said pattern conveyor for assembling a course of ceramic articles in abutting end-to-end relationship parallel to said edge on said flight, means for pushing said course onto the lead edge of the pattern conveyor, means for variably moving said flight of the pattern conveyor away from the assembling means a sufficient distance to provide space for a second course, and means for functioning the aforesaid means until a flat of ceramic articles is on the pattern conveyor.

2. The machine of claim 1 wherein the assembling means is also a conveyor having an upwardly open flight at approximately the level of the top flight of the pattern conveyor and movable parallel with the lead edge of the pattern conveyor.

3. A machine for hacking elongated ceramic articles into a flat comprising a frame, an endless pattern conveyor having an upwardly open, horizontal flight mounted on said frame, said pattern conveyor having a substantially flat surface, an assembling conveyor having an upwardly open flight at approximately the level of the top flight of the pattern conveyor positioned adjacent the lead edge of the pattern conveyor and movable substantially parallel to that edge, means for admitting a selected number of articles in abutting end-to-end relationship to the assembling conveyor, means for pushing said selected number of articles onto the lead edge of the pattern conveyor, means for moving said flight of the pattern conveyor by different distances away from the assembling conveyor a sufficient distance to provide space for a second course, and means for functioning the aforesaid means until a flat of variably spaced rows of ceramic articles is on the pattern conveyor.

4. A machine for hacking ceramic articles into a double flat comprising a frame, an endless pattern conveyor having an upwardly open horizontal, substantially flat flight mounted on said frame, means for positioning two courses of rectangular parallelepiped articles in abutting end-to-end relationship one on top of the other near and parallel to the lead edge of the pattern conveyor, means for pushing said courses onto the lead edge of the pattern conveyor, means for variably moving the pattern conveyor away from the positioning means a sufficient distance to provide space for a second course, and means for automatically repeating these two steps until a flat of variably spaced rows of articles is on the conveyor.

5. A machine for hacking ceramic articles into a double flat comprising a frame, an endless pattern conveyor having an upwardly open horizontal, substantially flat flight mounted on said frame, means adjacent the lead edge of said pattern conveyor for assembling a course of rectangular parallelepiped articles in end-to-end relationship parallel to said edge, a second means parallel to the lead edge of the pattern conveyor for assembling a second course of a like number of like articles parallel to said edge, means for positioning one course on top of the other course and on the lead edge of the pattern conveyor, means for variably moving the pattern conveyor away from the first assembling means a sufficient distance to provide space for a second double course, and means for repeating these two steps until a double flat of variably spaced rows of articles is on the pattern conveyor.

6. The machine of claim 5 wherein means is provided for pushing the first course onto the lead edge of the pattern conveyor while it is motionless, and means for placing the second course on top of the first course at said position on the pattern conveyor.

7. A machine for hacking ceramic articles into a double flat comprising a frame, an endless pattern conveyor having an upwardly open horizontal, substantially flat flight mounted on said frame, a first course endless conveyor disposed parallel to the lead edge of the pattern conveyor, means for pushing articles on the first course conveyor onto the pattern table, a second course endless conveyor positioned parallel to the first course endless conveyor and spaced therefrom, a turnover arm pivoted on an axis between and substantially parallel to the course conveyors, a clamp on the outer end of the arm adapted to clasp an entire row of articles on the second course conveyor and place it in registry on the first course.

8. The machine of claim 7 wherein the upper flight of the second course conveyor is approximately in the plane of the top of articles resting on the first course conveyor.

9. The machine of claim 7 together with means for raising or lowering the second course conveyor so that its upper flight may be at one of several vertical positions.

10. The machine of claim 7 together with means for admitting the same number of articles to each of the course conveyors, and means for functioning the pusher means, the arm and the clamp to position the articles from the second course conveyor in registry on the articles in the first course.

11. The machine of claim 7 together with controls preventing the actuation of the turnover arm, its clamp, and the pusher until both course conveyors carry the same selected number of articles.

12. The machine of claim 7 together with identical pusher members positioned at the delivery end of each of the course conveyors, and means for functioning said pusher members so as to align transversely the courses on the two course conveyors.

13. A machine for hacking ceramic articles into a double flat comprising a frame, an endless pattern conveyor having an upwardly open, horizontal flight mounted on said frame, a first course conveyor positioned adjacent the lead edge of said pattern conveyor with its top flight movable parallel to said edge, a second course conveyor substantially parallel to the first course conveyor and spaced therefrom and on the same side of the pattern conveyor, a turnover arm pivoted on an axis between said course conveyors and parallel to their line of motion and adapted to move from a location over the second course conveyor at locations near the first course conveyor, a pugmill conveyor for moving ceramic shapes in single file, and means for equally dividing ceramic articles carried by the pugmill conveyor into two paths, one path feeding the first course conveyor, and the other path feeding the second course conveyor.

14. A machine for hacking ceramic articles into a double flat comprising a frame, an endless pattern conveyor having an upwardly open, horizontal flight mounted on said frame, a first course conveyor positioned adjacent the lead edge of said pattern conveyor with its top flight movable parallel to said edge, a second course conveyor substantially parallel to the first course conveyor and spaced therefrom and on the same side of the pattern conveyor, a turnover arm pivoted on an axis between said course conveyors and parallel to their line of motion and adapted to move from a location over the second course conveyor at locations near the first conveyor a pugmill conveyor for moving ceramic shapes in a single file, means adjacent the pugmill conveyor for removing therefrom all ceramic articles not of a selected shape, and means for equally dividing ceramic articles carried by the pugmill conveyor into two paths, one path feeding the first course conveyor, and the other path feeding the second course conveyor.

15. A machine for hacking rectangular brick in flats of variably spaced rows of abutting end-to-end bricks comprising an endless pattern conveyor having a generally flat horizontal surface entrained over two rolls, one of which is a drive roll, means for positioning along the lead edge of said pattern conveyor at right angles to its line of movement a row of abutting end-to-end rectangular brick, means for pushing said row of brick onto the lead edge of the pattern conveyor, means for rotating said drive roll by a distance sufficient to expose at the lead edge of the conveyor space for a second row of abutting end-to-end brick, and control means for alternately functioning the row-positioning means and the pattern conveyor until a flat of spaced rows of brick is on the pattern conveyor.

16. The machine of claim 15 wherein an overriding clutch and arm are keyed to each end of the drive roll, and a drive means having an adjustable stroke actuates each arm.

References Cited in the file of this patent

UNITED STATES PATENTS

| 1,860,143 | Fuller et al. | May 24, 1932 |
| 2,579,094 | Rooksby | Dec. 18, 1951 |
| 2,703,182 | Broberg et al. | Mar. 1, 1955 |
| 2,710,696 | Fontaine et al. | June 14, 1955 |
| 2,827,179 | Maple | Mar. 18, 1958 |
| 2,833,426 | Bosken | May 6, 1958 |